(12) United States Patent
Ravindra et al.

(10) Patent No.: US 10,449,644 B2
(45) Date of Patent: Oct. 22, 2019

(54) LASER-TRANSMITTING TOOLING

(71) Applicant: Micro-LAM, Inc., Portage, MI (US)

(72) Inventors: Deepak V M Ravindra, Kalamazoo, MI (US); Sai Kumar Kode, Kalamazoo, MI (US)

(73) Assignee: Micro-LAM, Inc., Portage, MI (US)

( * ) Notice: Subject to any disclaimer, the term of this patent is extended or adjusted under 35 U.S.C. 154(b) by 268 days.

(21) Appl. No.: 15/653,019

(22) Filed: Jul. 18, 2017

(65) Prior Publication Data

US 2018/0015578 A1    Jan. 18, 2018

Related U.S. Application Data

(60) Provisional application No. 62/363,448, filed on Jul. 18, 2016.

(51) Int. Cl.
| | |
|---|---|
| *B23K 26/352* | (2014.01) |
| *B23K 26/362* | (2014.01) |
| *B23P 25/00* | (2006.01) |
| *B23K 26/064* | (2014.01) |
| *B23B 27/14* | (2006.01) |
| *B23C 5/16* | (2006.01) |
| B23K 26/00 | (2014.01) |

(52) U.S. Cl.
CPC ............ *B23P 25/006* (2013.01); *B23B 27/14* (2013.01); *B23C 5/16* (2013.01); *B23K 26/064* (2015.10); *B23B 2226/31* (2013.01); *B23B 2260/092* (2013.01); *B23C 2226/31* (2013.01); *B23C 2260/56* (2013.01); *B23K 26/0093* (2013.01)

(58) Field of Classification Search
CPC ......... B23P 26/00; B23K 26/00; B23K 26/06; B23K 26/352; B23K 26/362; B23C 5/16; B23B 27/14
USPC ....................................... 219/121.68, 121.69
See application file for complete search history.

(56) References Cited

U.S. PATENT DOCUMENTS

| | | | | | |
|---|---|---|---|---|---|
| 3,764,195 | A | * | 10/1973 | Blank ................ | G02B 6/12004 385/130 |
| 4,839,250 | A | * | 6/1989 | Cowan ................ | G02B 5/1857 359/22 |
| 6,185,019 | B1 | * | 2/2001 | Hobbs ................ | G02B 6/02133 359/30 |
| 7,002,100 | B2 | | 2/2006 | Wu et al. | |
| 8,053,705 | B2 | | 11/2011 | Shin | |
| 8,933,366 | B2 | | 1/2015 | Patten | |

(Continued)

*Primary Examiner* — Samuel M Heinrich
(74) *Attorney, Agent, or Firm* — Honigman LLP

(57) ABSTRACT

A laser-transmitting machining tool is disclosed. The laser-transmitting machining tool has a plurality of faces including an entrance face, a rake face, a flank face connected to the rake face, a rake side face extending between the entrance face and the rake face, and a flank side face extending between the entrance face and the flank face. The connection of the rake face to the flank face defines a cutting edge. The rake face extends away from the rake side face to define a rake angle. The entrance face is configured to receive and refract a laser beam to the rake face, the flank face, and the cutting edge for causing the laser beam to refract into and heat the workpiece at a compression region extending proximate at least the rake face and a tensile region extending proximate the flank face. A system for machining a workpiece is disclosed. A method for machining a workpiece is also disclosed.

29 Claims, 21 Drawing Sheets

(56) References Cited

U.S. PATENT DOCUMENTS

2017/0120345 A1 5/2017 Patten et al.
2017/0157712 A1* 6/2017 Doany ................. B23K 26/352

* cited by examiner

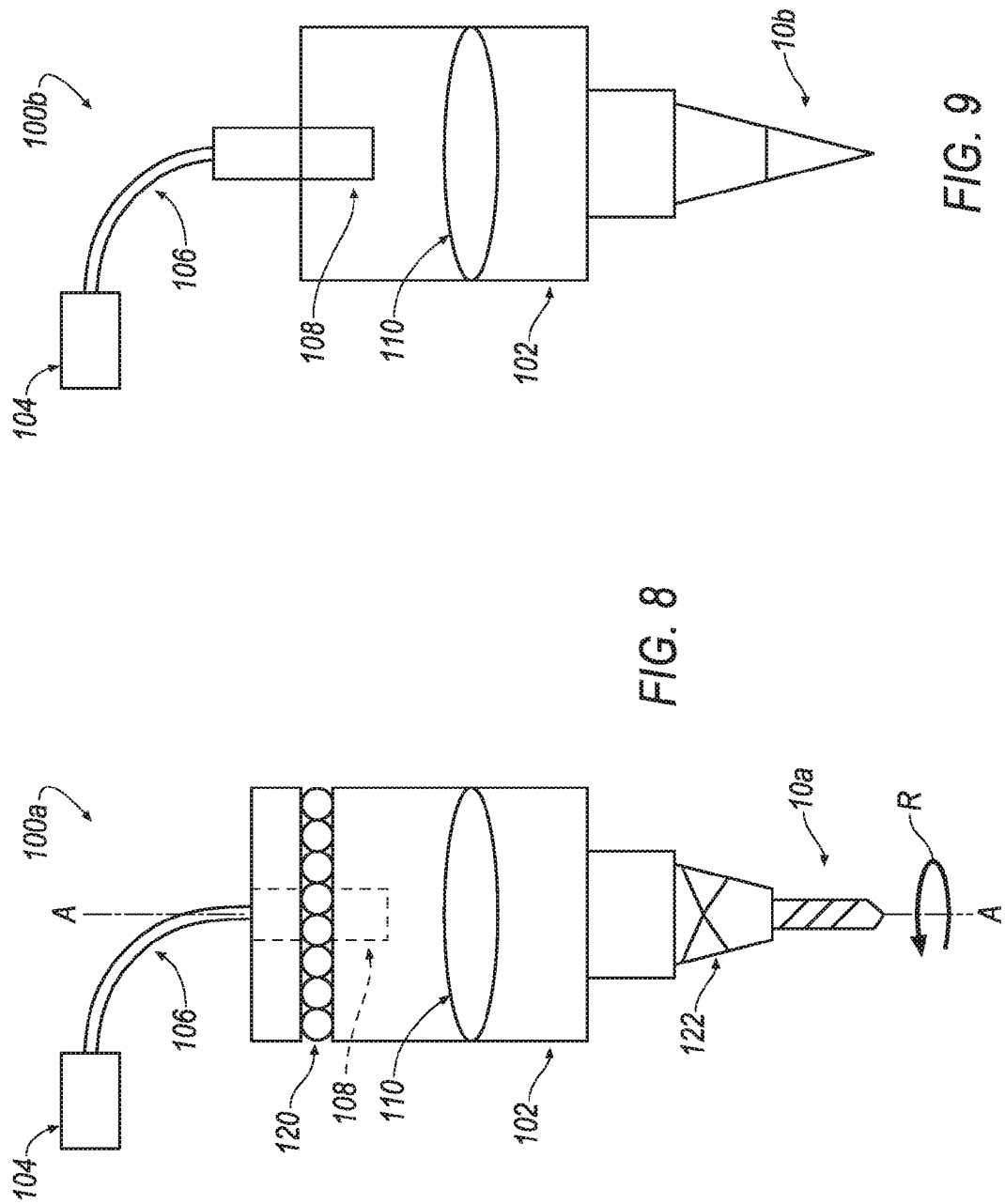

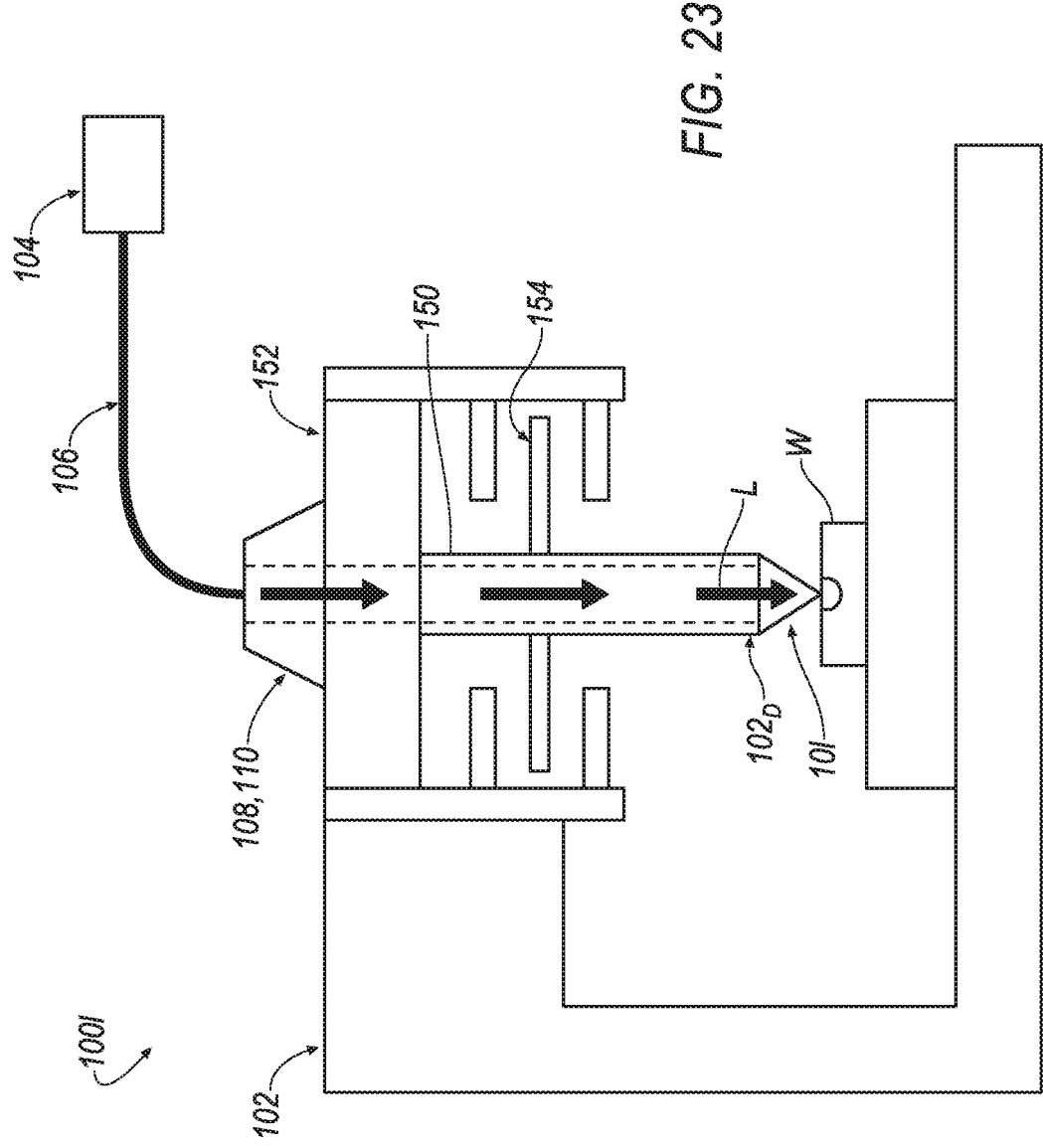

LASER-TRANSMITTING TOOLING

CROSS REFERENCE TO RELATED APPLICATIONS

This U.S. patent application claims priority U.S. Provisional Patent Application 62/363,448, filed on Jul. 18, 2016, which is hereby incorporated by reference in its entirety.

TECHNICAL FIELD

This disclosure relates to a laser-transmitting machining tool, a system including a laser-transmitting machining tool and a methodology for utilizing a system including a laser-transmitting machining tool for machining a workpiece.

BACKGROUND

This section provides background information related to the present disclosure which is not necessarily prior art.

Laser-assisted machining tools are known. While existing laser-assisted machining tools perform adequately for their intended purpose, improvements to laser-assisted machining tools are continuously being sought in order to advance the arts.

SUMMARY

The present disclosure provides a laser-transmitting machining tool including a rake face, a flank face and a cutting edge for machining a workpiece. The laser-transmitting machining tool is configured to receive and refract a laser beam to the rake face, the flank face and the cutting edge for causing the laser beam to refract into and heat the workpiece at a compression region extending proximate at least the rake face and a tensile region extending proximate the flank face. The rake face extends away from a rake side face of the laser-transmitting machining tool to define a rake angle. The rake angle is sized to define one of the following rake angles including: a negative rake angle, a zero rake angle and a positive rake angle. The negative rake angle may include one or more of a highly negative rake angle, a midrange negative rake angle and a low-range negative rake angle. The highly negative rake angle causes the compression region of the workpiece to be a highest compression region and the tensile region of the workpiece to be a lowest tensile region. The midrange negative rake angle causes the compression region of the workpiece to be a high compression region and the tensile region of the workpiece to be a low tensile region. The low-range negative rake angle causes the compression region of the workpiece to be a medium compression region and the tensile region of the workpiece to be a medium tensile region. The zero rake angle causes the compression region of the workpiece to be a low compression region and the tensile region of the workpiece to be a high tensile region. The positive rake angle causes the compression region of the workpiece to be a lowest compression region and the tensile region of the workpiece to be a highest tensile region.

One aspect of the disclosure provides a laser-transmitting machining tool for machining a workpiece. The laser-transmitting machining tool includes a body of material having an entrance face, a rake face, a flank face connected to the rake face, a rake side face extending between the entrance face and the rake face, and a flank side face extending between the entrance face and the flank face. The connection of the rake face to the flank face defines a cutting edge. The entrance face is configured to receive and refract a laser beam to the rake face, the flank face and the cutting edge for causing the laser beam to refract into and heat the workpiece at a compression region extending proximate at least the rake face and a tensile region extending proximate the flank face. The rake face extends away from the rake side face to define a rake angle. The flank face extends away from the flank side face to define a flank angle relative to the rake angle. The rake angle is sized to define one of the following rake angles including: a highly negative rake angle causing the compression region of the workpiece to be a highest compression region and the tensile region of the workpiece to be a lowest tensile region; a midrange negative rake angle causing the compression region of the workpiece to be a high compression region and the tensile region of the workpiece to be a low tensile region; a low-range negative rake angle causing the compression region of the workpiece to be a medium compression region and the tensile region of the workpiece to be a medium tensile region; a zero rake angle causing the compression region of the workpiece to be a low compression region and the tensile region of the workpiece to be a high tensile region; and a positive rake angle causing the compression region of the workpiece to be a lowest compression region and the tensile region of the workpiece to be a highest tensile region.

Implementations of the disclosure may include one or more of the following optional features. In some implementations, each of the highest compression region, the high compression region, the medium compression region, the low compression region and the lowest compression region also extends along the cutting edge. Each of the highest tensile region, the high tensile region, the medium tensile region, the low tensile region and the lowest tensile region also extends along the cutting edge.

In some implementations, the highly negative rake angle is less than each of the midrange negative rake angle, the low-range negative rake angle, the zero rake angle and the positive rake angle. In some instances, the highly negative rake angle is greater than about 90° and less than about 135°, wherein the midrange rake angle is greater than about 136° and less than about 165°, wherein the low-range negative rake angle is greater than about 166° and less than about 179°. In some examples, the zero rake angle is approximately 180°. In some instances, the positive rake angle is greater than about 181° and less than about 210°.

The material defining the body of laser-transmitting machining tool may be any desirable material that transmits light such as, for example, the laser beam. The material is selected from the group consisting of: a diamond, a sapphire, a carbide, cubic boron nitride (CBN), silicon, nitrides, steels, alloys, ceramics, alumina, crystals and glass composites. Optionally, an anti-reflective coating may be disposed over the entrance face.

In some implementations, the material defining the body of laser-transmitting machining tool includes a diamond material. The rake angle is sized to define one of the highly negative rake angle, the midrange negative rake angle or low-range negative rake angle. A relief angle defined by the entrance face relative to the laser beam is approximately 5°.

In some instances, the material defining the body of laser-transmitting machining tool includes a sapphire material. The rake angle is sized to define one of the highly negative rake angle, the midrange negative rake angle or low-range negative rake angle. A relief angle defined by the entrance face relative to the laser beam is approximately 7°.

In some examples, the material defining the body of laser-transmitting machining tool includes a diamond material. The rake angle is sized to define zero rake angle. A relief angle defined by the entrance face relative to the laser beam is approximately 7°.

Another aspect of the disclosure provides a system for machining a workpiece. The system includes a laser-transmitting machining tool having a body of material having a plurality of faces including a rake face that is connected to a flank face for defining a cutting edge of the laser-transmitting machining tool. The rake face extends away from a side face of the plurality of faces to define a rake angle. The rake angle is sized to define one of a plurality of rake angles including: a highly negative rake angle causing the compression region of the workpiece to be a highest compression region and the tensile region of the workpiece to be a lowest tensile region; a midrange negative rake angle causing the compression region of the workpiece to be a high compression region and the tensile region of the workpiece to be a low tensile region; a low-range negative rake angle causing the compression region of the workpiece to be a medium compression region and the tensile region of the workpiece to be a medium tensile region; a zero rake angle causing the compression region of the workpiece to be a low compression region and the tensile region of the workpiece to be a high tensile region; and a positive rake angle causing the compression region of the workpiece to be a lowest compression region and the tensile region of the workpiece to be a highest tensile region. The plurality of faces define a laser beam entrance end of the laser-transmitting machining tool and a laser beam exit end of the laser-transmitting machining tool. The laser beam exit end is defined by the rake face, the flank face and the cutting edge. The system also includes a house and a laser generator. The housing has an upstream end and a downstream end. The downstream end of the housing is optically-connected to the laser beam exit end of the laser-transmitting machining tool. The laser generator is optically-connected to the upstream end of the housing for optically-communicating a laser beam generated by the laser generator from the upstream end of the housing to the laser beam entrance end, through the body of material, and out of the cutting edge and one or both of the rake face and the flank face.

Implementations of the disclosure may include one or more of the following optional features. In some implementations, the optics and an optics interface. The optics includes at least a collimating lens and a series of focusing lens. The collimating lens is optically-connected to the laser generator for collimating the laser beam prior to being received by the laser beam entrance end of the laser-transmitting machining tool. The series of focusing lens are optically-connected to the collimating lens for focusing the laser beam prior to being received by the laser beam entrance end of the laser-transmitting machining tool. The optics interface includes a focusing knob connected to the series of focusing lens that adjusts focal plane and a diameter of the laser beam for selectively biasing rays of the laser beam toward the rake face or the flank face. The optics interface includes one or more beam positioning stages connected to the series of focusing lens that alters an angle of laser beam as the laser beam exits the collimating lens.

In some implementations, the system optionally includes an X-axis micrometer adjustment knob, a Y-axis micrometer adjustment knob and a Z-axis micrometer adjustment knob. Each of the X-axis micrometer adjustment knob, the Y-axis micrometer adjustment knob and the Z-axis micrometer adjustment knob is connected to the optics for selectively biasing rays of the laser beam toward the rake face or the flank face.

In some instances, the system optionally includes an optic sub-housing contained within the housing. The optic sub-housing is connected to the housing with a spatial adjusting device for adjusting the optics contained within the optical sub-housing in any of an X-direction, a Y-direction or a Z-direction of a three dimensional XYZ coordinate system for adjusting entry of the laser beam into the laser beam entrance end of the laser-transmitting machining tool.

In some examples, the system optionally includes a heat-activated or laser-activated cutting fluid, slurry or etchant contained within a supply or reservoir that is communicated out of a nozzle to the laser beam exit end of the laser-transmitting cutting tool. The system may also include an actuator including one or more of a pump and valve that is fluidly connected to the supply or reservoir for asserting control over an amount of the heat-activated or laser-activated cutting fluid, slurry or etchant that is to be disposed upon the laser beam exit end of the laser-transmitting cutting tool.

In some implementations, the system optionally includes a second laser generator optically-connected to the upstream end of the housing for optically-communicating a second laser beam generated by the second laser generator from the upstream end of the housing to the laser beam entrance end, through the body of material, and out of the cutting edge and one or both of the rake face and the flank face.

In some instances, the system optionally includes a visible beam imaging camera having beam alignment software and a computer workstation connected to the visible beam imaging camera. The visible beam imaging camera images a visible calibration light beam propagating through laser-transmitting machining tool and communicates an image of the visible calibration light beam propagating through the laser-transmitting machining tool to the beam alignment software. Upon the beam alignment software determining that the visible calibration light beam passing through the laser-transmitting machining tool is not aligned, the beam alignment software provides instructions to the computer workstation for displaying on a display instructions or a suggested optimization value associated with adjustment or rotation of one or more of the X-, Y- and Z-axis micrometer adjustment knobs.

In some examples, the system optionally includes an energy meter or power meter. The energy meter or power meter is connected to the computer workstation for measuring output power of the laser beam passing through the cutting edge of the laser-transmitting machining tool.

In some implementations, the system optionally includes a beam profiler connected to the computer workstation. The beam profiler and computer workstation detects an orientation angle or geometry of the laser-transmitting machining tool for aligning the laser beam passing through the laser-transmitting machining tool.

In some instances, the system optionally includes a precision tool height adjuster. The precision tool height adjuster is connected to the housing.

In some instances, the system optionally includes a smart swivel system. The smart swivel system is connected to the housing.

In some examples, the system optionally includes an isolated rotary bearing system connected to the housing and a beam splitter disposed within and arranged near the downstream end of the housing. The beam splitter delivers the laser beam to multiple locations of the laser beam entrance face.

Yet another aspect of the disclosure includes a method for machining a workpiece. The method includes transmitting, from a laser generator, a laser beam. The method also includes receiving, at an upstream end of a housing that is optically-connected to the laser generator, the laser beam. The method further includes receiving, at a laser beam entrance face that defines a laser beam entrance end of a laser-transmitting machining tool that is optically-connected to a downstream end of a housing, the laser beam. The method yet further includes transmitting the laser beam through the a body of material of the laser-transmitting machining tool that extends between the laser beam entrance end of the laser-transmitting machining tool and a laser beam exit end of the laser-transmitting machining tool. The method also includes selectively directing the laser beam out of a cutting edge of the laser-transmitting machining tool and one or both of a rake face of the laser-transmitting machining tool and a flank face of the laser-transmitting machining tool. The cutting edge, the rake face and the flank face defines the laser beam exit end of the laser-transmitting machining tool. The rake face extends away from a side face of the laser-transmitting machining tool to define a rake angle. The rake angle is sized to define one of a plurality of rake angles including: a highly negative rake angle causing the compression region of the workpiece to be a highest compression region and the tensile region of the workpiece to be a lowest tensile region; a midrange negative rake angle causing the compression region of the workpiece to be a high compression region and the tensile region of the workpiece to be a low tensile region; a low-range negative rake angle causing the compression region of the workpiece to be a medium compression region and the tensile region of the workpiece to be a medium tensile region; a zero rake angle causing the compression region of the workpiece to be a low compression region and the tensile region of the workpiece to be a high tensile region; and a positive rake angle causing the compression region of the workpiece to be a lowest compression region and the tensile region of the workpiece to be a highest tensile region.

Implementations of the disclosure may include one or more of the following optional features. In some implementations, the laser beam is defined by a diameter having a central ray extending along a central axis of the laser beam, a first circumferential array of rays arranged at a first radial distance away from the central axis of the laser beam and at least one second circumferential array of rays arranged at a second radial distance away from the central axis of the laser beam whereby the second radial distance is greater than the first radial distance. The step of selectively directing the laser beam may include directing the central ray of the laser beam out of the cutting edge of the laser-transmitting machining tool and biasing one or both of the first circumferential array of rays of the laser beam and the second circumferential array of rays of the laser beam toward one of the rake face and the flank face.

In some implementations, the step of biasing one or both of the first circumferential array of rays of the laser beam and the second circumferential array of rays of the laser beam toward one of the rake face and the flank face includes adjusting a focusing knob connected to a series of focusing lens disposed within the housing that adjusts focal plane and the diameter of the laser beam.

In some instances, the step of biasing one or both of the first circumferential array of rays of the laser beam and the second circumferential array of rays of the laser beam toward one of the rake face and the flank face includes: adjusting one or more beam positioning stages connected to a series of focusing lens disposed within the housing for altering an angle of laser beam as the laser beam exits a collimating lens disposed within the housing.

In some examples, the step of biasing one or both of the first circumferential array of rays of the laser beam and the second circumferential array of rays of the laser beam toward one of the rake face and the flank face includes: adjusting one or more of an X-axis micrometer adjustment knob, a Y-axis micrometer adjustment knob connected to the optics and a Z-axis micrometer adjustment knob connected to a series of focusing lens disposed within the housing.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 8 is a schematic view of an exemplary system including a laser-transmitting drilling/milling tool.

FIG. 9 is a schematic view of an exemplary system including a laser-transmitting scribing/scoring tool.

FIG. 10' is a schematic view of an exemplary system including a laser-transmitting polishing tool.

FIG. 23 is a schematic view of an exemplary material characterization testing system including a laser-transmitting indentation tool that indents a workpiece W.

Like reference symbols in the various drawings indicate like elements.

DETAILED DESCRIPTION

An aspect of the present disclosure is directed to a system including a laser generator and a laser-transmitting machining tool. The laser-transmitting machining tool may machine a workpiece defined by a material (e.g., ceramics, semiconductors, optical crystals, glass, metal alloys, plastics, composites, bone, teeth and the like) that minimizes tooling forces while improving surface finish, aesthetics, form repeatability, and overall machinability of the workpiece.

Another aspect of the present disclosure includes a methodology for utilizing the system including the laser-transmitting machining tool for machining the workpiece. In an example, after directly engaging the workpiece with the laser-transmitting machining tool, the laser-transmitting machining tool transmits laser radiation from the laser generator to the workpiece for the purpose of weakening the bonds of the workpiece and therefor softening the workpiece in order to ultimately plastically deform and/or thermally soften the workpiece.

Figure 1:
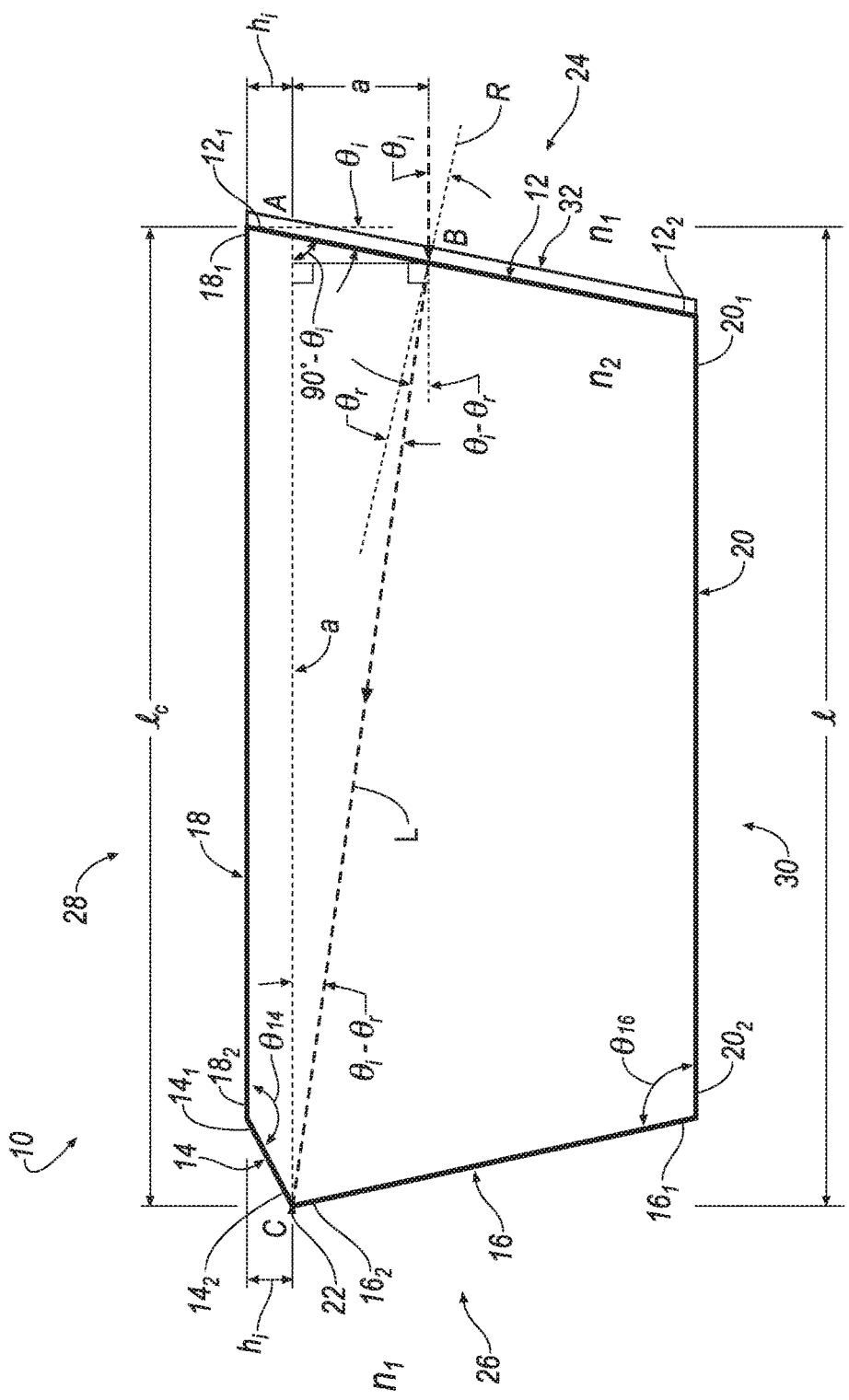
FIG. 1 is a plan view of an exemplary laser-transmitting machining tool.

Referring to FIG. 1, an exemplary laser-transmitting machining tool is shown generally at 10. The laser-transmitting machining tool 10 defines a plurality of surfaces or faces 12-20. The surface 12 of the plurality of surfaces or faces 12-20 may be referred to as a laser beam entrance face. The surface 14 of the plurality of surfaces or faces 12-20 may be referred to as a rake face. The surface 16 of the plurality of surfaces or faces 12-20 may be referred to as a flank face or clearance face. The surface 18 of the plurality of surfaces or faces 12-20 may be referred to as a first side face or a rake side face. The surface 20 of the plurality of surfaces or faces 12-20 may be referred to as a second side face or a flank side face.

A first end $18_1$ of the first side face 18 extends away from a first end $12_1$ of the laser beam entrance face 12. A first end $20_1$ of the second side face 20 extends away from a second end $12_2$ of the laser beam entrance face 12.

A first end $14_1$ of the rake face 14 extends away from a second end $18_2$ of the first side face 18. A first end $16_1$ of the flank face 16 extends away from a second end $20_2$ of the second side face 20. A second end $14_2$ of the rake face 14 is joined is joined to a second end $16_2$ of the flank face 16 to define a cutting edge 22.

Furthermore, the first end $14_1$ of the rake face 14 extends away from the second end $18_2$ of the first side face 18 at an angle $\theta_{14}$, and the first end $16_1$ of the flank face 16 extends away from the second end $20_2$ of the second side face 20 at an angle $\theta_{16}$. The angle $\theta_{14}$ defined by the rake face 14 and the first side face 18 may be referred to as a rake angle. The angle $\theta_{16}$ defined by the flank face 16 and the second side face 20 may be referred to as a flank angle or clearance angle. As will be described in greater detail with respect to FIGS. 5A-5E, the rake angle $\theta_{14}$ and the flank angle $\theta_{16}$ are described in the context of the laser-transmitting machining tool 10 itself and not with respect to a surrounding environment relative the laser-transmitting machining tool 10 such as, for example, how the laser-transmitting machining tool 10 is positioned relative to a workpiece (see, e.g., W in FIG. 4).

One or more surfaces (see, e.g., laser beam entrance face 12) of the plurality of surfaces or faces 12-20 may define a laser beam entrance end 24 of the laser-transmitting machining tool 10. Further, one or more surfaces (see, e.g., rake face 14 and flank face 16) of the plurality of surfaces or faces 12-20 may define a laser beam exit end 26 of the laser-transmitting machining tool 10.

Furthermore, one or more surfaces (see, e.g. rake face 14 and first side face 18) of the plurality of surfaces or faces 12-20 may define a first side 28 of the laser-transmitting machining tool 10. Furthermore, one or more surfaces (see, e.g. laser beam entrance face 12, flank face 16 and second side face 20) of the plurality of surfaces or faces 12-20 may define a second side 30 of the laser-transmitting machining tool 10.

The laser-transmitting machining tool 10 defines a tool length l. In an example, the tool length l is bound by the first end $18_1$ of the first side face 18 and the cutting edge 22.

Furthermore, the laser-transmitting machining tool 10 may also include an anti-reflective coating 32 applied to at least one of the plurality of surfaces or faces 12-20 of the laser-transmitting machining tool 10. In an example, the anti-reflective coating 32 may be applied to the laser beam entrance face 12

Inclusion of the heat-activated/laser-activated cutting fluid/slurry/etchant 137 upon one or both of the cutting edge 22, rake face 14 and flank face 16, permits the laser-transmitting machining tool 10 to chemically react in response to being subjected to heat or exposure of a laser beam L when the laser beam L exits the exit end 26 of the laser-transmitting machining tool 10. After reaction of the heat-activated/laser-activated cutting fluid/slurry/etchant 137 and arranging the laser-transmitting machining tool 10 adjacent the workpiece W, the removal rate of material from the workpiece W is increased while also using less tooling forces imparted from the laser-transmitting machining tool 10.

As seen in FIG. 1, the laser beam L is transmitted through the laser-transmitting machining tool 10. The laser beam L is directed from a laser generator (see, e.g., 104 in FIG. 7) towards the laser beam entrance end 24 of the laser-transmitting machining tool 10. The laser beam L enters the laser-transmitting machining tool 10 at the laser beam entrance face 12 at a relief angle $\theta_i$ relative to a line R that is normal to the laser beam entrance face 12. The laser beam L is then refracted internally within the laser-transmitting machining tool 10 at an angle $\theta_r$ and travels along the length l of the laser-transmitting machining tool 10 from the laser beam entrance end 24 of the laser-transmitting machining tool 10 to the laser beam exit end 26 of the laser-transmitting machining tool 10.

Figure 2A:
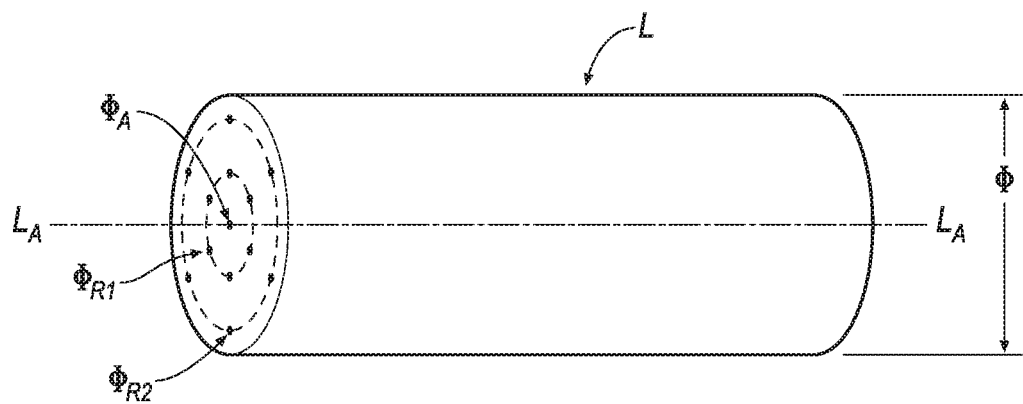
FIG. 2A is a perspective view of an exemplary laser beam.
Figure 2B:
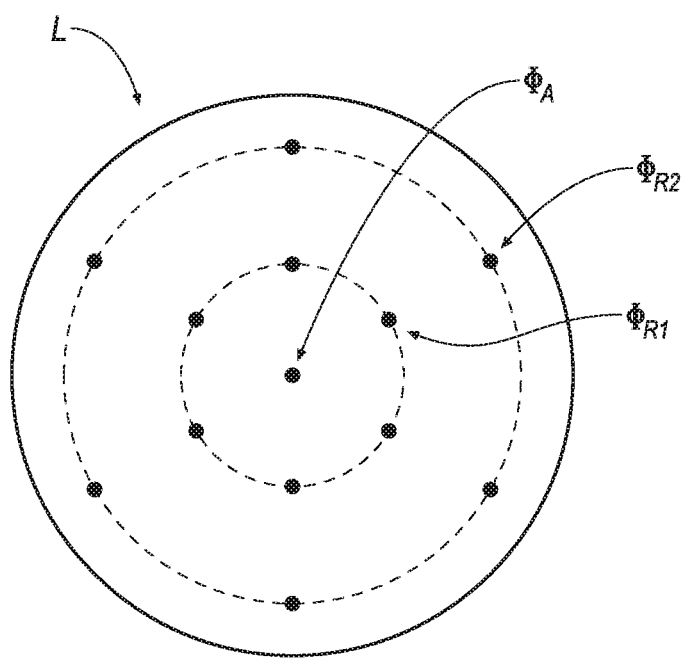
FIG. 2B is an end view of the laser beam of FIG. 2A.

With reference to FIGS. 2A and 2B, the laser beam L defines a laser beam diameter $\Phi$. The laser beam diameter $\Phi$ may further define: a central ray $\Phi_A$ extending along a central axis $L_A$-$L_A$ (see, e.g., FIG. 2A) of the laser beam L; a first circumferential array of rays $\Phi_{R1}$ arranged at a first radial distance away from the central axis $L_A$-$L_A$ of the laser beam L; and at least one second circumferential array of rays $\Phi_{R2}$ arranged at a second radial distance away from the central axis $L_A$-$L_A$ of the laser beam L whereby the second radial distance is greater than the first radial distance.

Figure 3:
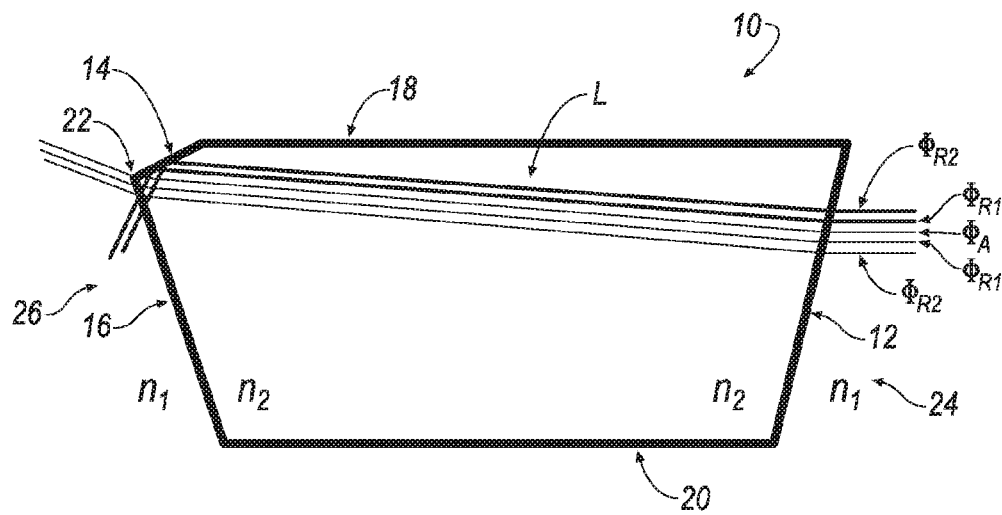
FIG. 3 is a side view of the laser-transmitting machining tool of FIG. 1 transmitting the laser beam of FIGS. 2A-2B.

With reference to FIG. 3, according to the refraction principles of light, the laser beam L will undergo another refraction when exiting the laser-transmitting machining tool 10 provided that the laser beam L strikes the laser beam entrance face 12 with less than the critical angle when going from a first medium (e.g., a diamond material) of a higher refractive index $n_2$ to a second medium (e.g., air) of a lower refractive index $n_1$. The governing relationship is given by:

$$\sin\theta_c = \frac{1}{n} \qquad (1)$$

In an example, for a laser beam L transitioning from diamond to air, a diamond material may have a critical angle of 24.4°; any incident laser beam L striking a surface greater than this angle will reflect internally in the diamond. In an example, FIG. 3 illustrates exemplary reflected rays $\Phi_{R1}$, $\Phi_{R2}$ exiting the laser beam exit end 26 that are directed from the laser beam entrance face 12 to the rake face 14.

Figure 4:
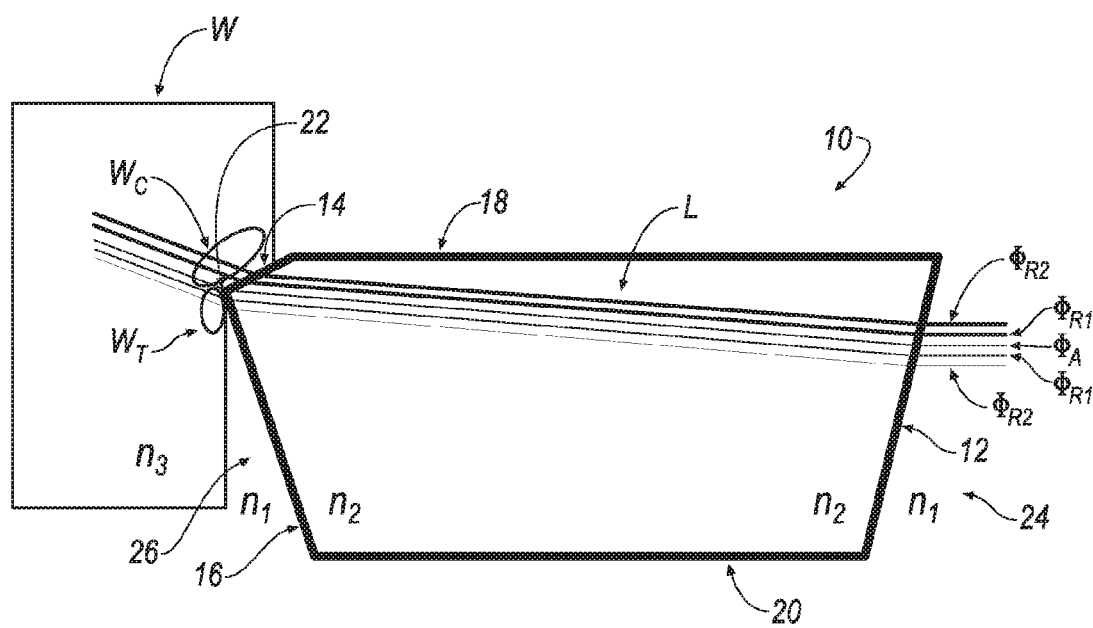
FIG. 4 is a view of the laser-transmitting machining tool of engaging a workpiece while transmitting the laser beam of FIGS. 2A-2B.

With reference to FIG. 4, at least a portion of the laser beam exit end 26 of the laser-transmitting machining tool 10 contacts, is disposed adjacent or immersed into a workpiece W during the machining process. The material defining the workpiece W may include but not limited to ceramics, semiconductors, optical crystals, glass, metal alloys, plastics, composites, bone, teeth and the like. Arranging the laser-transmitting machining tool 10 adjacent or immersing the laser-transmitting machining tool 10 into a volume of the workpiece W allow the rays $\Phi_A$, $\Phi_{R1}$, $\Phi_{R2}$ of laser beam L to be transmitted into and absorbed by selected portions of the workpiece W as the index of refraction $n_3$ of the workpiece W is higher than the index of refraction $n_1$ of air, which results in an increase of the critical angle for internal reflection.

In an example, an exemplary laser-transmitting machining tool 10 composed of silicon may be defined by an index of refraction $n_2$ equal to 3.4 such that no limitation for internal reflection exists as the workpiece W being machined has a higher index of refraction $n_3$ compared to the index of refraction $n_2$ of an exemplary laser-transmitting machining tool 10 composed of a diamond. The rays $\Phi_A$, $\Phi_{R1}$, $\Phi_{R2}$ of a laser beam L will enter the immersed area of a workpiece W, allowing the laser beam L to treat a selected region of the workpiece W undergoing compressive stresses effectively. Accordingly, as seen in FIG. 4, the rays $\Phi_{R1}$, $\Phi_{R2}$ of the laser beam L exiting the rake face 14 are allowed to propagate into the workpiece W of similar or higher index of refraction whereas the rays $\Phi_{R1}$, $\Phi_{R2}$ of the laser beam L exiting the flank face 16 represent a portion of the laser beam L affecting the workpiece W that had already been machined by the flank face 14 and the cutting edge 22 (i.e., the flank face 16 anneals the workpiece W as the flank face 16 contacts the workpiece W).

As seen in FIG. 4, the central ray $\Phi_A$ of the laser beam L is focused on and exits the cutting edge 22 of the laser beam exit end 26 of the laser-transmitting machining tool 10. As explained above, in addition to the laser beam L exiting the cutting edge 22 of the laser beam exit end 26 of the laser-transmitting machining tool 10, the laser beam L also exits one or both of the rake face 14 of the laser beam exit end 26 of the laser-transmitting machining tool 10 and the flank face 16 of the laser beam exit end 26 of the laser-transmitting machining tool 10. In an example, some of the first and second circumferential array of rays $\Phi_{R1}$, $\Phi_{R2}$ may exit the rake face 14 and some of the first and second circumferential array of rays $\Phi_{R1}$, $\Phi_{R2}$ may exit the flank face 16.

With continued reference to FIG. 4, the laser beam exit end 26 of the laser-transmitting machining tool 10 may be disposed adjacent a workpiece W that is plastically deformed and/or thermally-softened by the laser-transmitting machining tool 10. The workpiece W may generally define a compressive region $W_C$ and a tensile region $W_T$.

In some instances, the compression region $W_C$ of the workpiece W may generally extend across the rake face 14 and a portion of the flank face 16 near the second end $16_2$ of the flank face 16 (i.e., the compression region $W_C$ of the workpiece W extends across the cutting edge 22 of the laser-transmitting machining tool 10). In some examples, the tensile region $W_T$ of the workpiece W may generally extend across the flank face 16 of the laser-transmitting machining tool 10 near the second end $16_2$ of the flank face 16 without extending across the cutting edge 22 of the laser-transmitting machining tool 10. In other examples, the tensile region $W_T$ of the workpiece W may generally extend from the flank face 16 and across the cutting edge 22 such that the tensile region $W_T$ of the workpiece W extends slightly across the rake face 14 of the laser-transmitting machining tool 10 near the second end $14_2$ of the rake face 14. In some instances, the tensile region $W_T$ may extend slightly across the rake face 14, and, in such instances, the tensile region $W_T$ extending slightly across the rake face 14 is not limited to the geometry of the laser transmitting tool 10, the material of the workpiece W, processing parameters and the like.

Referring to FIGS. 5A-5E, one or both of the rake angle $\theta_{14}$ and the flank angle $\theta_{16}$ may correspond to one or more qualities of a material of a workpiece W that is to be machined by the laser-transmitting machining tool 10. In an example, the rake angle $\theta_{14}$ may range between approximately about 91° and 195° the flank angle $\theta_{16}$ may range between approximately about 93° and 120°. The one or more qualities of the material of a workpiece W may be related to different levels of a compressive force imparted from the laser-transmitting machining tool 10 to the compression region $W_C$ of the workpiece W and a tensile force imparted from the laser-transmitting machining tool 10 to the tensile region $W_T$ of the workpiece W.

Figure 5A:
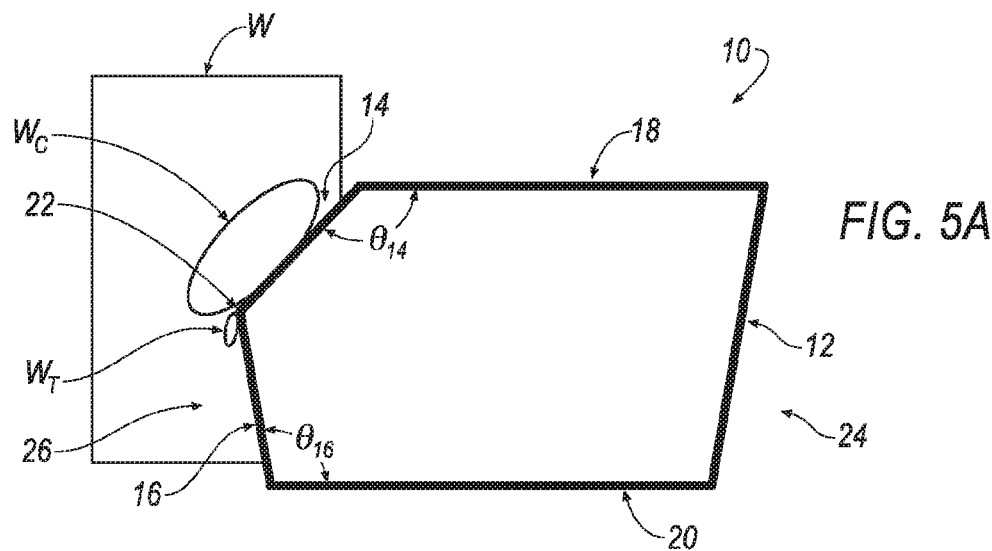
FIG. 5A is a side view of the laser-transmitting machining tool of FIG. 1 arranged relative a workpiece having a highest compression region extending along at least a rake face of the laser-transmitting machining tool and a lowest tensile region extending across a flank face of the laser-transmitting machining tool.

In an example, the rake angle $\theta_{14}$ of FIG. 5A may be referred to as a highly negative rake angle and may be greater than 90° less than about 135°. The rake angle $\theta_{14}$ of FIG. 5B may be referred to as a midrange negative rake angle, which may be greater than the highly negative rake angle $\theta_{14}$ of FIG. 5A; in an example, the midrange negative rake angle $\theta_{14}$ may be greater than about 136° and less than about 165°. The rake angle $\theta_{14}$ of FIG. 5C may be referred to as a low-range negative rake angle, which may be greater than the midrange negative rake angle $\theta_{14}$ of FIG. 5B; in an example, the low-range negative rake angle $\theta_{14}$ may be greater than about 166° and less than about 179°. The rake angle $\theta_{14}$ of FIG. 5D may be referred to as a zero rake angle, which is greater than the low-range negative rake angle $\theta_{14}$ of FIG. 5C; in an example, the zero rake angle may be approximately equal to 180°. The rake angle $\theta_{14}$ of FIG. 5E may be referred to as a positive rake angle, which may be greater than the zero rake angle $\theta_{14}$ of FIG. 5D; in an example, the positive rake angle $\theta_{14}$ may be greater than about 181° and less than about 210°. With reference to Table 1, exemplary materials and corresponding exemplary ranges of rake angles $\theta_{14}$ are shown below.

TABLE 1

| Material Of The Workpiece W | Rake Angle $\theta_{14}$ Range |
|---|---|
| Silicon | About 135° to About 155° |
| Zinc Selenide | About 145° to About 165° |
| Zinc Sulfide | About 145° to About 165° |
| Calcium Fluoride | About 145° to About 165° |
| Tungsten Carbide | About 145° to About 180° |
| Aluminum | About 175° to About 190° |
| Steel or Stainless Steel | About 175° to About 190° |
| Germanium | About 135° to About 165° |
| Glass | About 135° to About 165° |
| Sapphire | About 135° to About 165° |
| Spinel | About 135° to About 165° |
| Barium Fluoride | About 135° to About 165° |

Figure 5B:
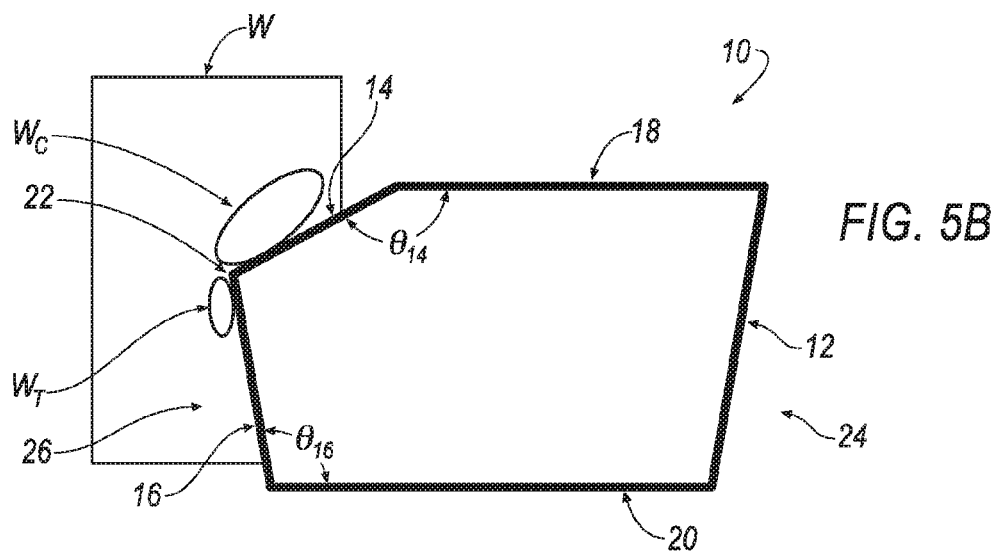
FIG. 5B is a side view of the laser-transmitting machining tool of FIG. 1 arranged relative a workpiece having a high compression region extending along at least a rake face of the laser-transmitting machining tool and a low tensile region extending across a flank face of the laser-transmitting machining tool.
Figure 5C:
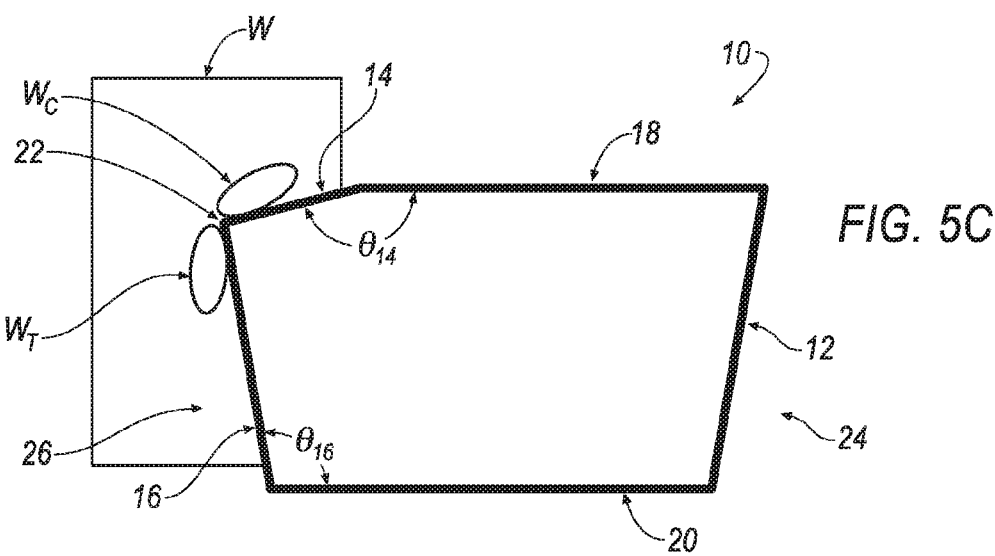
FIG. 5C is a side view of the laser-transmitting machining tool of FIG. 1 arranged relative a workpiece having a medium compression region extending along at least a rake face of the laser-transmitting machining tool and a medium tensile region extending across a flank face of the laser-transmitting machining tool.

In an example, the highly negative rake angle $\theta_{14}$ of FIG. 5A of the midrange negative rake angle $\theta_{14}$ of FIG. 5B may be a preferable configuration of the laser-transmitting machining tool 10 when the material defining the workpiece W is, for example, a ceramic or optical crystal material that is stronger in compression with respect to tension (i.e., the forces involved in machining the compression region $W_C$ are comparatively greater the tensile region $W_T$). In addition to design consideration of one or both of the rake angle $\theta_{14}$ and the flank angle $\theta_{16}$, the laser beam L radiated from the laser beam exit end 26 of the laser-transmitting machining tool 10 may also be selectively adjusted in order to compensate for known compressive and tensile qualities of the workpiece W.

In another example, the highly negative rake angle $\theta_{14}$ may be an angle ranging between about 135° and about 155° for machining a workpiece W derived from a silicon material with a laser beam L focused on the cutting edge 22 but also biased towards the rake face 14 in order to promote plastic deformation, thermal softening and removal of material in the compression region $W_C$ of the workpiece W. Alternatively, if desired, the laser beam B may be focused on the cutting edge 22 but also biased toward the flank face 16 in order to minimize sub-surface damage to the tensile region $W_T$ of the workpiece W and promote an annealing or "healing" effect of the workpiece W. Accordingly, the act of biasing the laser beam L toward the rake face 14 increases material removal while preserving the integrity of the laser-transmitting machining tool 10. Furthermore, post-processing (e.g., polishing) of the workpiece W may be minimized or eliminated if the laser beam L is biased toward the flank face 16.

Figure 5D:
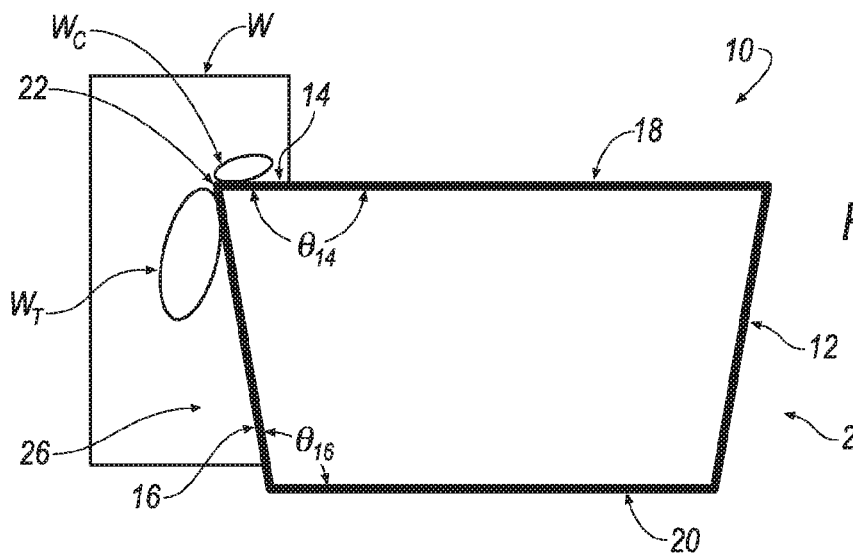
FIG. 5D is a side view of the laser-transmitting machining tool of FIG. 1 arranged relative a workpiece having a low compression region extending along at least a rake face of the laser-transmitting machining tool and a high tensile region extending across a flank face of the laser-transmitting machining tool.
Figure 5E:
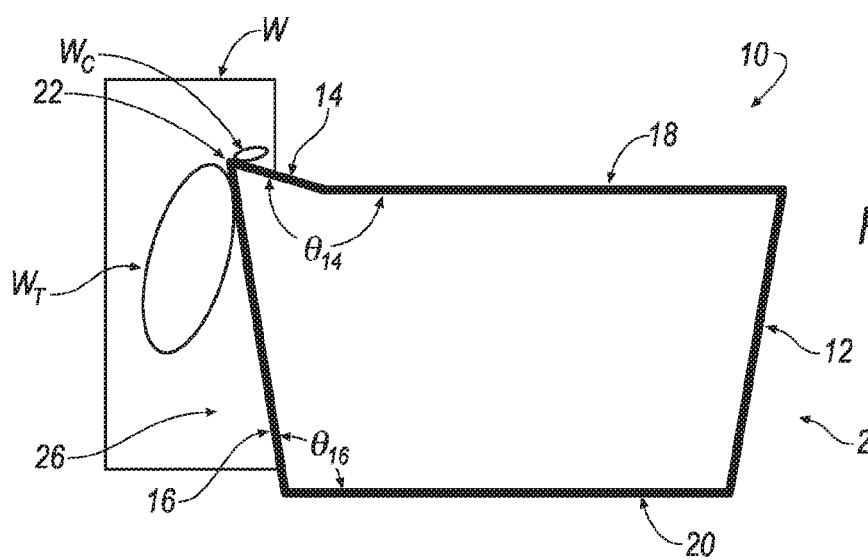
FIG. 5E is a side view of the laser-transmitting machining tool of FIG. 1 arranged relative a workpiece having a lowest compression region extending along at least a rake face of the laser-transmitting machining tool and a highest tensile region extending across a flank face of the laser-transmitting machining tool.

In yet another example with reference to FIG. 5D, a zero rake angle $\theta_{14}$ may be selected for machining a workpiece W derived from a metal or metal composition due to the fact that most metals (such as, e.g., aluminum) are stronger in tensile with respect to compression; therefore, positive rake angles $\theta_{14}$ (see, e.g., FIG. 5E) or rake angles $\theta_{14}$ close to zero degrees (see, e.g., FIG. 5C) may be utilized for machining metallic or polymeric materials. Composite materials, however, are of many types and therefore material composition will control too geometry. Accordingly, in order to promote the machinability in the tensile region for a material having a strong tensile quality, the laser beam L may be focused on the cutting edge 22 but also biased towards the flank face 16 in order to promote plastic deformation, thermal softening and removal of material in the tensile region $W_T$ of the workpiece W.

With reference to FIG. 1, the act of biasing of the laser beam to one of the rake face 14 and the flank face 16 of the laser beam exit end 26 of the laser-transmitting machining tool 10 is described as follows. In an example, the laser-transmitting machining tool 10 of FIG. 1 may be defined by a midrange negative rake angle $\theta_{14}$, and based on Snell's law, the minimum relief angle $\theta_i$ can be calculated given a known length l of the laser-transmitting machining tool 10 and a desired location (see, e.g., horizontal line a) below the cutting edge 22.

When light (i.e., the laser beam L) enters a medium of a higher refractive index $n_2$ (i.e., the medium defined by the laser-transmitting machining tool 10), the beam of light will refract for incident beams not perpendicular to the laser beam entrance face 12. Exemplary materials defining the medium of the laser-transmitting machining tool 10 may include but are not limited to: diamonds, sapphires, carbides, cubic boron nitride (CBN), silicon, nitrides, steels, alloys, ceramics, alumina, crystals, glass composites and the like. The amount that light will refract is based on Snell's Law, which states that the sines of the entry angles are constrained using the following relation:

$$\frac{\sin\theta_1}{\sin\theta_2} = \frac{n_2}{n_1} = \frac{\sin\theta_i}{\sin\theta_r} \qquad (2)$$

Assuming $n_1=1$ for Air, $\theta_2$ can be derived as follows:

$$\sin\theta_2 = \frac{\sin\theta_1}{n_2} \qquad (3)$$

$$\theta_2 = \sin^{-1}\left(\sin\frac{\theta_1}{n_2}\right) \qquad (4)$$

$$\therefore \theta_2 = \frac{\theta_1}{n_2} \text{ also rewritten as } \theta_r = \frac{\theta_i}{n_2} \qquad (5)$$

For the triangle ABC identified at angles A, B and C in FIG. 1, where angle A is $90°-\theta_i$ and angle C is $\theta_i-\theta_r$ using the alternate interior angle relationship. Using the rewritten form for Snell's law, angle C may also be rewritten as:

$$\theta_i - \frac{\theta_i}{n_2} \qquad (6)$$

For a desired location of the laser beam L below the line a of the cutting edge 22, the triangle ABC can be solved for the minimum back angle required to refract the laser beam upward into the cutting edge 22 using the following formula provided that the index of refraction $n_2$ of the laser-transmitting machining tool 10 and length l of the laser-transmitting machining tool 10 is known (noting that that length $l_c$ is the compensated length of the triangle for a reduction in length due to the back relief angle $\theta_i$). In an example, a diamond-based laser-transmitting machining tools 10 may be defined by an initial lap amount $h_i$ ranging between 0.050 mm to 0.100 mm. Therefore the corresponding inverse tangent for the length l shortened is small for $$\theta_i < 20° \text{ and when } \frac{l}{h_i} \geq 20 \tag{7}$$

and it can be assumed that $$l_c \cong l \tag{8}$$

Equation 9, which is shown below, can be solved for known values a and l in order to obtain $\theta_i$.

$$a = l \frac{\tan\left(\theta_i - \frac{\theta_i}{n_2}\right) \cdot \tan(90° - \theta_i)}{\tan\left(\theta_i - \frac{\theta_i}{n_2}\right) + \tan(90° - \theta_i)} \text{ for } 0 < \theta_i < 90° \tag{9}$$

Where:
$l_c \cong l$=length of the diamond
a=desired location of beam below cutting edge line
$\theta_i$=minimum angle of incidence to achieve refraction of beam to cutting edge With reference to FIGS. 2A and 2B, the desired location of the laser beam may correspond to the light (i.e., laser) beam diameter Φ. In an example, the desired location of the beam may directly correspond to the laser beam diameter Φ according to Equation 10, which is shown below $$a = \frac{\Phi}{2}(1 + R\,\%) \tag{10}$$

where R % corresponds to the extra margin of safety to ensure the entire laser beam L is below the line of the cutting edge 22.

Utilizing Equation 9 and Equation 10 above, the following Examples and associated Tables represent a plurality of exemplary laser-transmitting machining tools 10. As seen below, each of the exemplary laser-transmitting machining tools 10 may be defined by, for example, different rake angles $\theta_{14}$ and materials (e.g., diamonds, sapphires, carbides, cubic boron nitride (CBN), silicon, nitrides, steels, alloys, ceramics, alumina, crystals, glass composites and the like) defining the medium of the laser-transmitting machining tool 10.

The following exemplary laser-transmitting machining tool 10 is directed to a negative rake angle $\theta_{14}$ (see, e.g., FIG. 5A, 5B or 5C) and a diamond material.

Example 1

TABLE 2

| | |
|---|---|
| R % | 20% |
| l | 2.4 mm |
| $n_2$ | 2.417 |
| Φ | 0.200 mm |
| $h_i$ | 0.050 mm |

Applying the variable data of Table 2 to Equation 10, a (i.e., the desired location of the light beam below the cutting edge 22) is solved as follows:

$$a = \frac{\Phi}{2}(1 + R\,\%) \tag{11}$$

$$a = \frac{0.200}{2}(1 + 0.20) \tag{12}$$

$$a = 0.12 \text{ mm} \tag{13}$$

Whereby the effective beam position below the first side face 18 of the laser-transmitting machining tool 10 is: $(h_i+a)=(0.050 \text{ mm}+0.12 \text{ mm})=0.17$ mm.

Then, applying solved a (i.e., the desired location of the light beam below the cutting edge 22) and the variable data of Table 2 to Equation 1, the minimum relief angle, $\theta_i$, is solved, as follows:

$$a = l \frac{\tan\left(\theta_i - \frac{\theta_i}{n_2}\right) \cdot \tan(90° - \theta_i)}{\tan\left(\theta_i - \frac{\theta_i}{n_2}\right) + \tan(90° - \theta_i)} \text{ for } 0 < \theta_i < 90° \tag{14}$$

$$0.12 = 2.4 \frac{\tan\left(\theta_i - \frac{\theta_i}{2.417}\right) \cdot \tan(90° - \theta_i)}{\tan\left(\theta_i - \frac{\theta_i}{2.417}\right) + \tan(90° - \theta_i)} \text{ for } 0 < \theta_i < 90° \tag{15}$$

$$\theta_i = 5° \tag{16}$$

The following exemplary laser-transmitting machining tool 10 is directed to a negative rake angle $\theta_{14}$ (see, e.g., FIG. 5A, 5B or 5C) and a sapphire material.

Example 2

TABLE 3

| | |
|---|---|
| R % | 20% |
| l | 2.4 mm |
| $n_2$ | 1.7 |
| Φ | 0.200 mm |
| $h_i$ | 0.050 mm |

Applying the variable data of Table 3 to Equation 10, a (i.e., the desired location of the light beam below the cutting edge 22) is solved as follows:

$$a = \frac{\Phi}{2}(1 + R\%) \quad (17)$$

$$a = \frac{0.200}{2}(1 + 0.20) \quad (18)$$

$$a = 0.12 \text{ mm} \quad (19)$$

Whereby the effective beam position below the first side face 18 of the laser-transmitting machining tool 10 is: $(h_i + a) = (0.050 \text{ mm} + 0.12 \text{ mm}) = 0.17 \text{ mm}$.

Then, applying solved a (i.e., the desired location of the light beam below the cutting edge 22) and the variable data of Table 3 to Equation 9, the minimum relief angle, $\theta_i$, is solved as follows:

$$a = l \frac{\tan\left(\theta_i - \frac{\theta_i}{n_2}\right) \cdot \tan(90° - \theta_i)}{\tan\left(\theta_i - \frac{\theta_i}{n_2}\right) + \tan(90° - \theta_i)} \text{ for } 0 < \theta_i < 90° \quad (20)$$

$$0.12 = 2.4 \frac{\tan\left(\theta_i - \frac{\theta_i}{1.7}\right) \cdot \tan(90° - \theta_i)}{\tan\left(\theta_i - \frac{\theta_i}{1.7}\right) + \tan(90° - \theta_i)} \text{ for } 0 < \theta_i < 90° \quad (21)$$

$$\theta_i = 7° \quad (22)$$

Comparatively, as seen above, the lower index of refraction $n_2$ defined by sapphire of EXAMPLE 2 results in a greater back relief angle $\theta_i$ to direct the laser beam L to the cutting edge 22, given the same entry position of the laser beam L below the first side face 18 of the diamond-based laser-transmitting machining tool 10 of EXAMPLE 1.

The following exemplary laser-transmitting machining tool 10 is directed to a zero rake angle $\theta_{14}$ (see, e.g., FIG. 5D) and a diamond material.

Example 3

TABLE 4

| R % | 70% |
|---|---|
| l | 2.4 mm |
| $n_2$ | 2.417 |
| $\Phi$ | 0.200 mm |
| $h_i$ | 0 mm |

Applying the variable data of Table 4 to Equation 10, a (i.e., the desired location of the light beam below the cutting edge 22) is solved as follows:

$$a = \frac{\Phi}{2}(1 + R\%) \quad (23)$$

$$a = \frac{0.200}{2}(1 + 0.70) \quad (24)$$

$$a = 0.17 \text{ mm} \quad (25)$$

Whereby the effective beam position below the first side face 18 of the laser-transmitting machining tool 10 is: $(h_i + a) = (0 \text{ mm} + 0.17 \text{ mm}) = 0.17 \text{ mm}$.

Then, applying solved a (i.e., the desired location of the light beam below the cutting edge 22) and the variable data of Table 4 to Equation 9, the minimum relief angle, $\theta_i$, is solved, as follows:

$$a = l \frac{\tan\left(\theta_i - \frac{\theta_i}{n_2}\right) \cdot \tan(90° - \theta_i)}{\tan\left(\theta_i - \frac{\theta_i}{n_2}\right) + \tan(90° - \theta_i)} \text{ for } 0 < \theta_i < 90° \quad (26)$$

$$0.17 = 2.4 \frac{\tan\left(\theta_i - \frac{\theta_i}{2.417}\right) \cdot \tan(90° - \theta_i)}{\tan\left(\theta_i - \frac{\theta_i}{2.417}\right) + \tan(90° - \theta_i)} \text{ for } 0 < \theta_i < 90° \quad (27)$$

$$\theta_i = 7° \quad (28)$$

Figure 6:
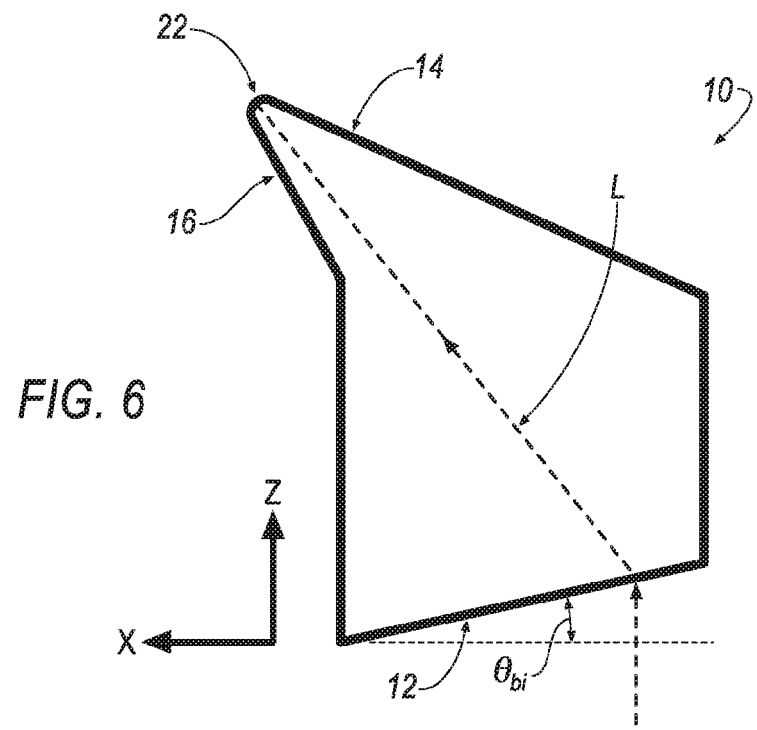
FIG. 6 is a top view of an exemplary laser-transmitting boring/split radius tool.

Referring to FIG. 6, an exemplary laser-transmitting machining tool 10 is shown, which may be a boring/split radius tool. FIG. 6 represents a top view of the laser-transmitting boring/split radius tool 10 as noted by the X-Z reference coordinates. As seen in FIG. 6, the laser-transmitting boring/split radius tool 10 is sized to provide a sufficient relief angle $\theta_{bi}$ at the laser beam entrance face 12 that allows the laser beam L to refract towards the cutting edge 22 when positioned on the back face of a tool holder (not shown). The plane can be defined as a rotation about the Y-axis with the Y axis pointing out of the page according to the X-Z reference coordinates; in addition to the relief angle $\theta_{bi}$, the laser beam entrance face 12 may be relieved further to direct the laser beam L upward to the cutting edge corresponding to $\theta_i$.

Figure 7:
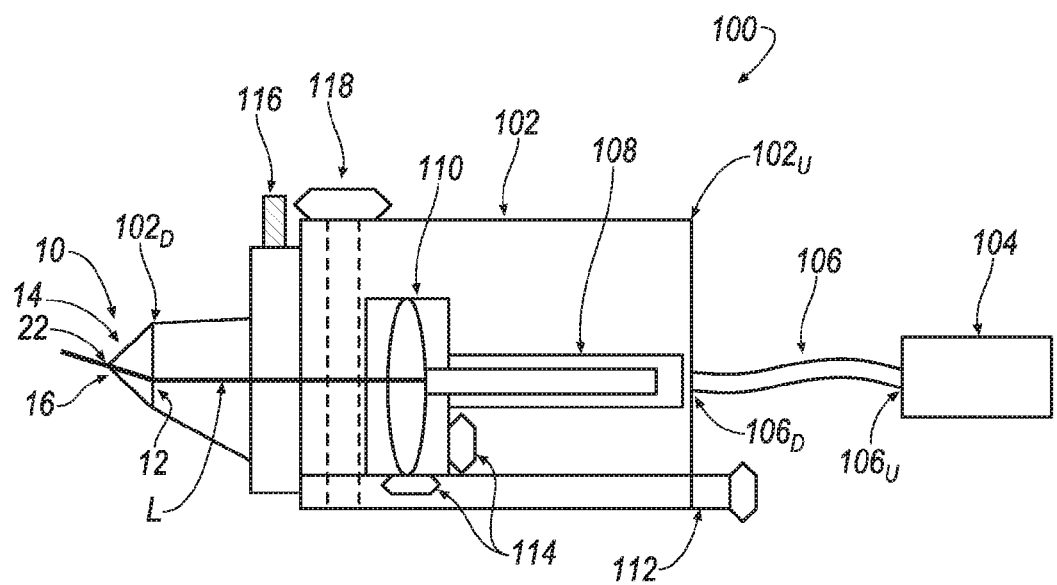
FIG. 7 is a schematic view of an exemplary system including a laser-transmitting machining tool.

Referring to FIG. 7, a system 100 is shown including any of laser-transmitting machining tools 10 described above. In an example, the system 100 may be retrofit on to an existing machine tool for providing laser-assisted machining of workpieces W. In another example, the system 100 may be implemented as stand-alone equipment for providing laser-assisted machining of workpieces W.

The system 100 includes a housing 102 having an upstream end $102_U$ and a downstream end $102_D$. The downstream end $102_D$ of the housing 102 may define a recess, cavity or the like that is sized for mechanically-retaining the laser-transmitting machining tool 10. The upstream end $102_U$ of the housing 102 that is optically-connected to a laser generator 104 by an optical fiber 106, which is defined by an upstream end $106_U$ and a downstream end $106_D$.

The laser generator 104 generates the laser beam L, which is directed from the upstream end $106_U$ of the optical fiber 106, through the length of the optical fiber 106 and out of the downstream end $106_D$ of the optical fiber 106, which is connected to the upstream end $102_U$ of the housing 102. The laser beam L is optically-communicated from the upstream end $102_U$ of the housing 102, through the length of the housing 102 and out of the downstream end $102_D$ of the housing 102 such that the laser beam L is directed at the laser beam entrance face 12 of the laser-transmitting machining tool 10. The laser beam L then travels through the laser-transmitting machining tool 10 and exits the cutting edge 22 and one or both of the rake face 14 and the flank face 16 of the laser-transmitting machining tool 10. Although the laser beam L has been described above as being transmitted through the optical fiber 106, the use of the optical fiber 106 is an exemplary configuration, as it should be understood that the laser beam L may be transmitted from the laser generator 104 to the housing 102 in any desirable manner.

Although a laser beam L is described above as being generated by the laser generator 104, the laser generator 104 be alternatively referred to as a "generator" that generates light, energy or the like. In an example, the generator 104 may generate a light beam L anywhere in the electromagnetic spectra, including visible to the invisible regime of the light spectra.

In an example, the system 100 may include a collimating lens 108 that is disposed within the housing 102 and optically-connected to the downstream end 106$_D$ of the optical fiber 106. The collimating lens 108 collimates the laser beam L, which is then guided through a series of focusing lens 110 disposed within housing 102 downstream of and optically-connected to the collimating lens 108. The series of focusing lens 110 reduces the spot size and focuses the laser beam L to a focal plane, which may extends across the laser beam entrance face 12 of the laser-transmitting machining tool 10.

The system 100 may also include a focusing knob 112 that is connected to the series of focusing lens 110. By rotating the focusing knob 112, a user may selectively-adjust the laser beam diameter Φ and focal plane by shifting the position of the series of focusing lens 110.

In response to the shaping and/or sizing of the laser beam L, the user may assert control over how the laser beam L exits the laser beam exit end 26 of the laser-transmitting machining tool 10 such that the laser beam L exits not only the cutting edge 22 but also one or both of the rake face 14 and the flank face 16 whereby the rays Φ$_{R1}$, Φ$_{R2}$ exiting the laser beam exit end 26 may be selectively biased for exiting one of the rake face 14 and the flank face 16 over the other of the rake face 14 and the flank face 16.

The laser beam L may be shaped and/or sized based on the contact area between the laser beam exit end 26 of the laser-transmitting machining tool 10 and the workpiece W as well as other machining parameters including but not limited to speed (e.g., spindle RPM), depth of cut of the workpiece W, cross-feed and laser power. Furthermore, the laser beam L can be precisely positioned with respect to the cutting edge 22 using beam positioning stages 114 connected to the series of focusing lens 110 that alters the angle of laser beam L as the laser beam L exits the collimating lens 108.

In another example, the system 100 may include a precision tool height adjuster 116 connected to the housing 102 that allows for fine and course adjustment of the cutting edge 22 of the laser-transmitting machining tool 10 with respect to the workpiece W. User manipulation of the precision tool height adjuster 116 permits an improved finish and figure form when manufacturing precision parts with sub-micron (i.e., less than 1 micro-meter) tolerances.

In yet another example, the system 100 may include smart swivel system 118 connected to the housing 102. The smart swivel system 118 permits the cutting edge 22 of the laser-transmitting machining tool 10 to be rotated at any desired angle in order to enable the cutting edge 22 of the laser-transmitting machining tool 10 to cut and wear uniformly along its entire cutting radius when, for example, machining concave or convex surfaces of a workpiece W where the rotation angle of the laser-transmitting machining tool 10 is optimized such that the wear region along the cutting edge 22 is symmetrical about its center.

As described above, the system 100 may be incorporated as a retrofitted system or a stand-alone instrument for providing laser-assisted machining of workpieces W. As seen above in FIG. 6, the laser-transmitting machining tool 10 may be a boring/split radius tool, and, as such, the machining process executed by the system 100 may be include the act of boring a workpiece W. Although the machining process executed by the system 100 may be include the act of boring, the machining process is not limited to boring and may include, for example, lathing, precision (i.e., tolerances in the 10s or 100s of micrometers) drilling/milling (see, e.g., FIG. 8), scribing/scoring (see, e.g., FIG. 9), dicing (see, e.g., FIG. 10) and the like. In an example, turning operations are operations that rotate the workpiece W as the primary method of moving material against a machining tool; lathes are the principal machine tool used in turning. In another example, milling operations are operations in which the machining tool rotates to bring one or more cutting edges to bear against the workpiece W; milling machines are the principal machine tool used in milling. In yet another example, drilling operations are operations in which holes are produced or refined by bringing a rotating machining tool with cutting edges at the lower extremity into contact with the workpiece W; drilling operations are done primarily in drill presses but also sometimes on lathes or mills. In even yet another example, dicing operations may include breaking or sawing using a precision (i.e., tolerances in the 10s or 100s of micrometers) wheel/saw.

Figure 10:
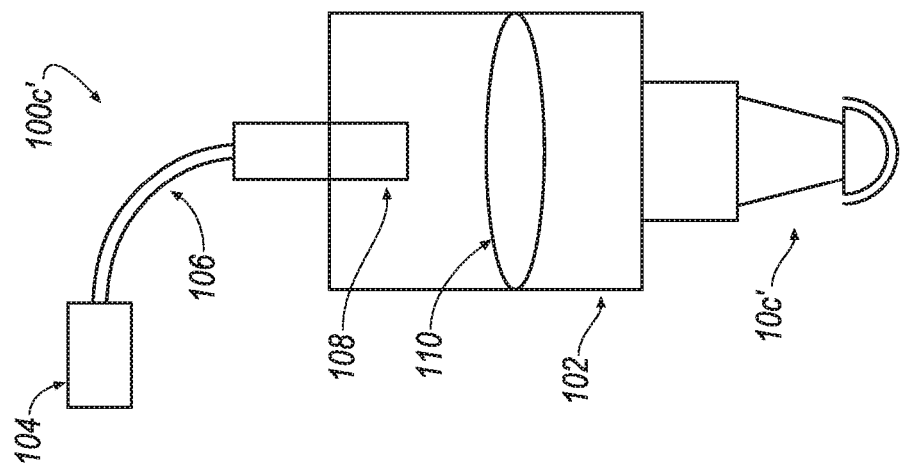
FIG. 10 is a schematic view of an exemplary system including a laser-transmitting dicing tool.
Figure 10:
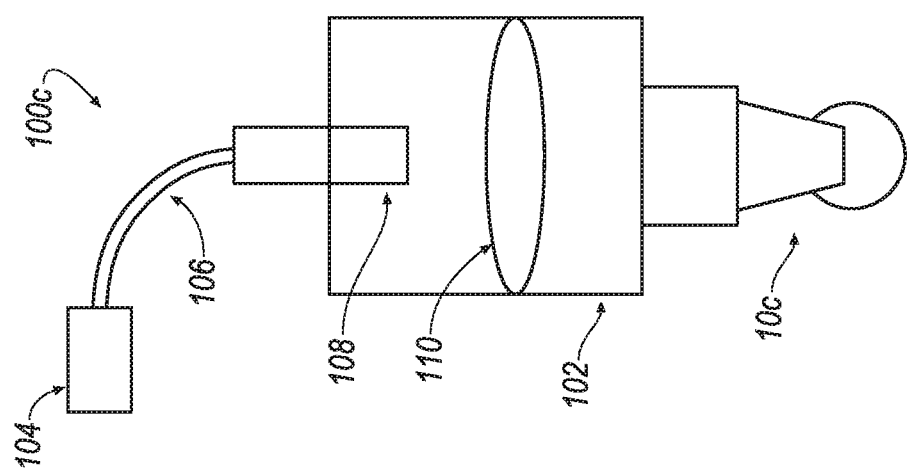

With reference to FIGS. 8-10', exemplary systems are shown generally at 100*a*, 100*b* and 100*c*. The system 100*a* of FIG. 8 is an exemplary drilling/milling system including an exemplary laser-transmitting drilling/milling tool 10*a*. The system 100*b* of FIG. 9 is an exemplary scribing/scoring system including an exemplary laser-transmitting scribing/scoring tool 10*b*. The system 100*c* of FIG. 10 is an exemplary dicing system including an exemplary laser-transmitting dicing tool 10*c*. The system 100*c'* of FIG. 10' is an exemplary polishing system including an exemplary laser-transmitting polishing tool 10*c'*. The systems 100*a*, 100*b*, 100*c*, 100*c'* may include substantially similar structure and components of the system 100 of FIG. 7 and therefore are not described in further detail here.

In an example, the drilling/milling system 100*a* of FIG. 8 may rotate R about a central axis A-A for machining the workpiece W. In order to permit rotation R about the central axis A-A, the housing 102 may include an isolated rotary bearing system 120. The isolated rotary bearing system 120 prevent optics disposed within the housing 102 from rotating as the laser-transmitting drilling/milling tool 10*a* rotates. Furthermore, the drilling/milling system 100*a* may include a beam splitter 122 disposed within and arranged near the downstream end 102$_D$ of the housing 102 for delivering the laser beam L to multiple locations of the laser beam entrance face 12 of the laser-transmitting drilling/milling tool 10*a*. Exemplary uses of the drilling/milling system 100*a* may include but are not limited to precision drilling/milling of ceramics, semiconductors, optical crystals, glass, metals, bone, teeth and the like.

In an example, the scribing/scoring system 100*b* of FIG. 9 and the dicing system 100*c* of FIG. 10 may include substantially similar structure with respect to the housing 102 except for the shape and/or structure of the respective laser-transmitting machining tools 10*b*, 10*c*. As seen in FIG. 9, the scribing/scoring system 100*b* includes a conically-shaped laser-transmitting scribing/scoring tool 10*b* that resembles a stylus. Exemplary uses of the scribing/scoring system 100*b* may include but are not limited to semiconductor wafer scribing/scoring, semiconductor circuit scoring and the like. As seen in FIG. 10, the dicing system 100*c* includes a substantially flat or blunt laser-transmitting dicing tool 10*c*. Although the laser-transmitting dicing tool 10*c* may be constantly rotating, the laser beam L may remain stationary as the contact spot between the laser beam exit end 26 of the laser-transmitting dicing tool 10c and the workpiece W is along a fixed-beam-path. Exemplary uses of the dicing system 100c may include but are not limited to glass dicing, wafer dicing, and the like.

In an example, the polishing system 100c' of FIG. 10' may include an optical pad interface that allows a laser beam L to be transmitted there-through to a polishing/lapping pad. Transmission of the laser beam L allows for thermal softening of the workpiece W. Softening of the workpiece W will promote a higher material removal rate versus a conventional non-laser polishing/lapping process. Additionally, a heat-activated/laser-activated cutting fluid/slurry/etchant 137 (see, e.g., FIG. 17) may be sprayed or disposed upon the laser beam exit end 26 of the laser-transmitting polishing tool 10c and/or lapping pad in order to enhance laser transmission as well as enhancing the polishing/lapping characteristics of the workpiece W.

Figure 11:
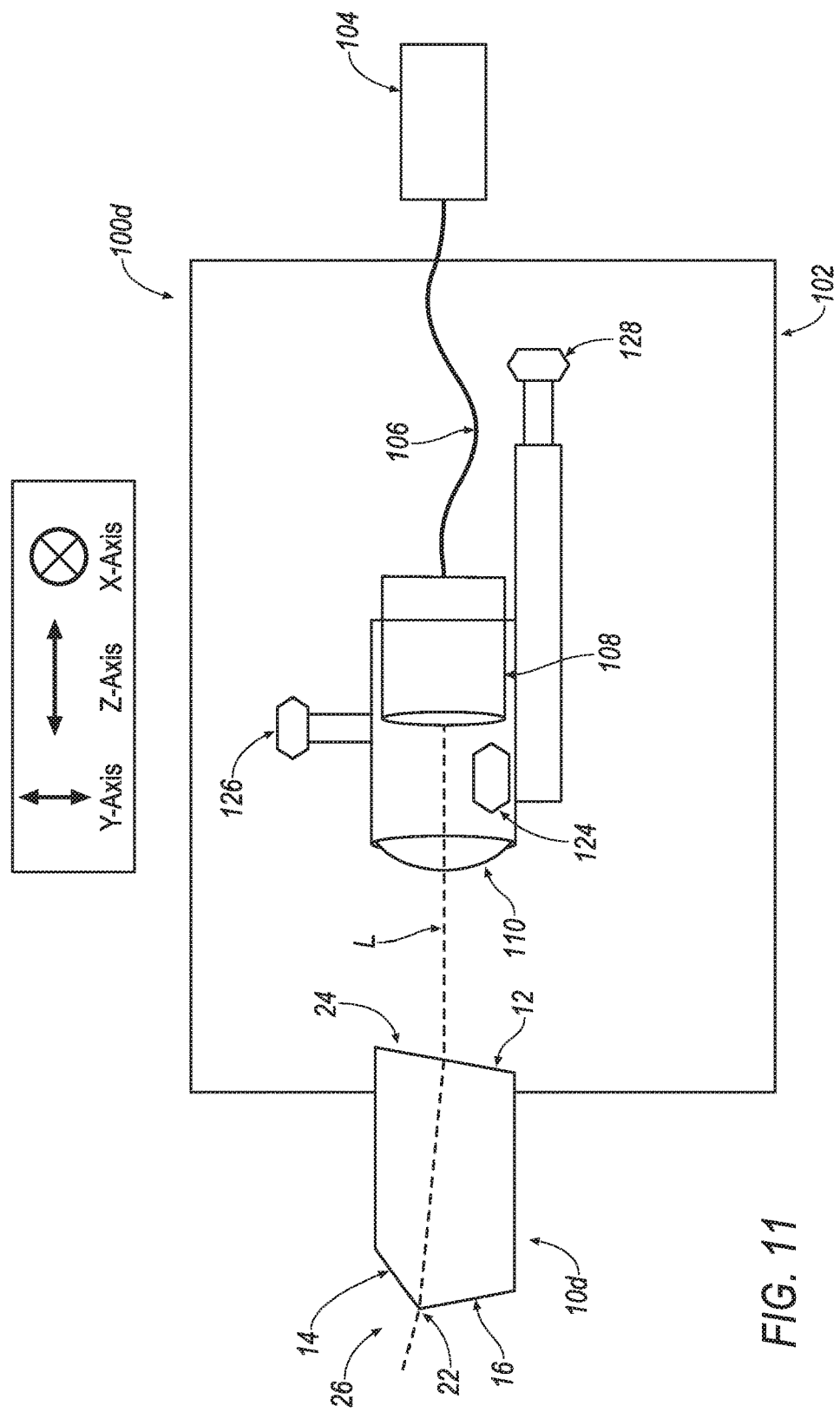
FIG. 11 is a schematic view of an exemplary system including a laser-transmitting machining tool.

With reference to FIG. 11, an exemplary system is shown generally at 100d. The system 100d is an exemplary cutting system including an exemplary laser-transmitting cutting tool 10d. The laser-transmitting cutting tool 10d may include a substantially similar geometry to that of the laser-transmitting machining tool 10 of FIG. 1 described above. The system 100d may include substantially similar structure and components of the system 100 of FIG. 7 and therefore are not described in further detail here.

As similarly described above with respect to the system 100 of FIG. 7, the generator 104 of the system 100d may generate a light beam L anywhere in the electromagnetic spectra, including visible to the invisible regime of the light spectra. In an example, the generator 104 may be a laser generator including a dual laser system (i.e., visible light and IR light) where both of the visible light beam and the IR light beam are co-linear. The visible light beam, which may be, for example, a 632 nm HeNe beam, is utilized to center the light beam L with respect to the nose radius of the laser-transmitting cutting tool 10d, along an X-axis (of an XYZ coordinate system); the IR light beam, which may be, for example, 1064 nm is utilized to align the light beam L to its desired position along a Y-axis (of an XYZ coordinate system).

As seen in FIG. 11, the housing 102 may also include an X-axis micrometer adjustment knob 124, a Y-axis micrometer adjustment knob 126 and a Z-axis micrometer adjustment knob 128. The X-, Y- and Z-axis micrometer adjustment knobs 124, 126, 128 are connected to the collimating lens 108 and the series of focusing lens 110 such that rotation of one or more of the X-, Y- and Z-axis micrometer adjustment knobs 124, 126, 128 results in precise control over how the light beam L enters the laser beam entrance face 12 of the laser-transmitting of the laser-transmitting cutting tool 10d in order to selectively direct the light beam L out of the cutting edge 22 and one or more of the rake face 14 and the flank face 16 of the laser beam exit end 26 of the laser-transmitting cutting tool 10d.

Figure 12:
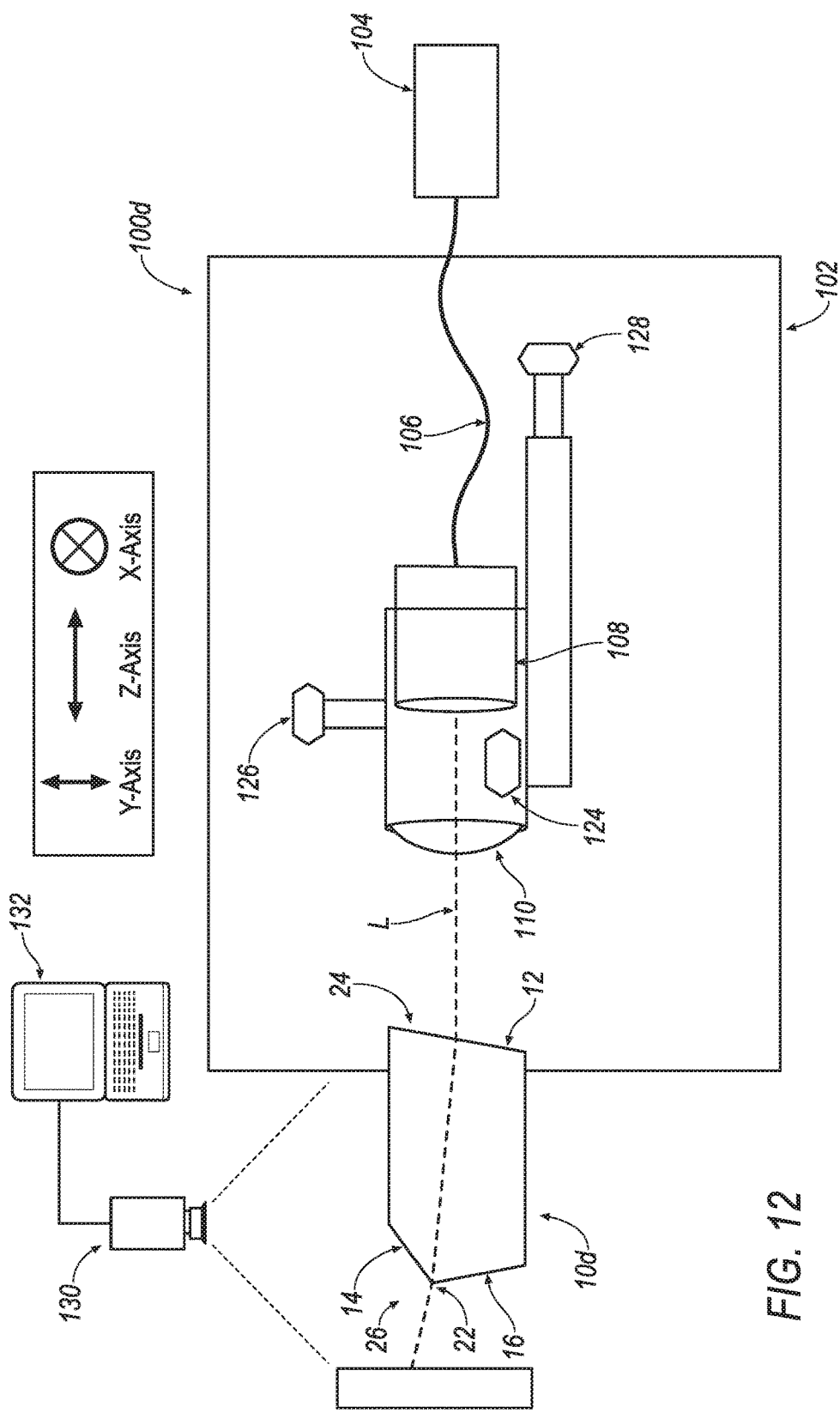
FIG. 12 is another schematic view of an exemplary system including a laser-transmitting machining tool.

Referring to FIG. 12, the visible beam of the light beam L is utilized for positioning the light beam L to a desired X-axis location (of an XYZ coordinate system). Because the visible beam of the light beam L is co-linear to the IR beam of the light beam L, the visible beam acts as a guide laser.

As seen in FIG. 12, the system 100d may also include a visible beam imaging camera 130 that includes beam alignment software. In an example, the camera 130 may be connected to a computer workstation 132 including programs that are executable and/or interpretable on a programmable system including at least one programmable processor, which may be special or general purpose, coupled to receive data and instructions from, and to transmit data and instructions to, a storage system, at least one input device, and at least one output device. In response to the beam alignment software determining that the visible beam of the light beam L, which may be referred to as a visible calibration light beam, is not optimally aligned according to an image that was imaged by the visible beam imaging camera 130, the camera 130 may send a signal to the computer workstation 132 for displaying on a display instructions or a suggested optimization value associated with adjustment or rotation of one or more of the X-, Y- and Z-axis micrometer adjustment knobs 124, 126, 128.

Figure 13A:
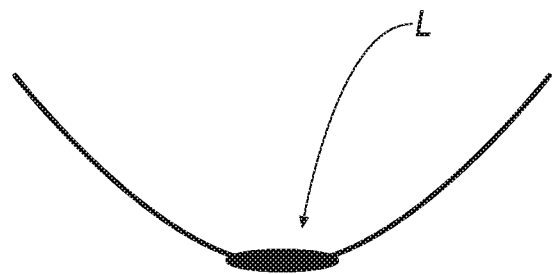
FIGS. 13A-13C illustrate exemplary crescent-shaped light beams transmitted through a cutting edge of a laser-transmitting machining tool.
Figure 13B:
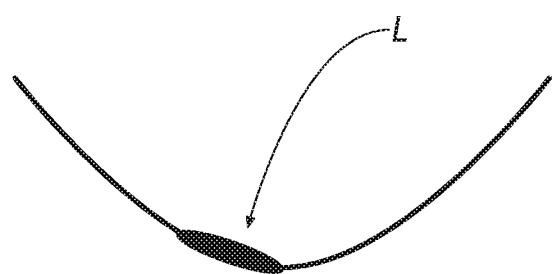
Figure 13C:
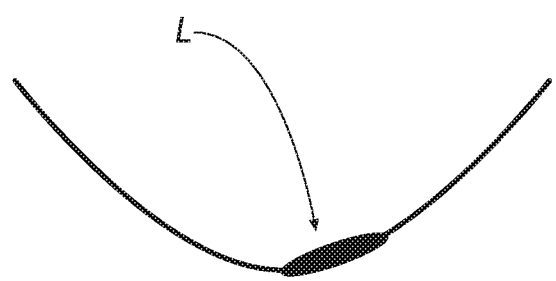

The visible light beam L that is projected by the generator 104 may be shaped to resemble the cutting edge 22 or nose radius of the laser-transmitting cutting tool 10d. With reference to FIGS. 13A-13C, the visible light beam L projected by the generator 104 may shaped to resemble a crescent shape that corresponds to the shape of the cutting edge 22 or nose radius of the laser-transmitting cutting tool 10d. In an example, one or more of the X-, Y- and Z-axis micrometer adjustment knobs 124, 126, 128 may be adjusted in order to center (see, e.g., FIG. 13A) or bias (see, e.g., a left light beam bias in FIG. 13B or a right light beam bias in FIG. 13C) the visible light beam L in a desired direction depending on, for example, geometry of the workpiece W that is being cut or a maximum "work area" along the nose radius of the laser-transmitting cutting tool 10d.

Figure 14:
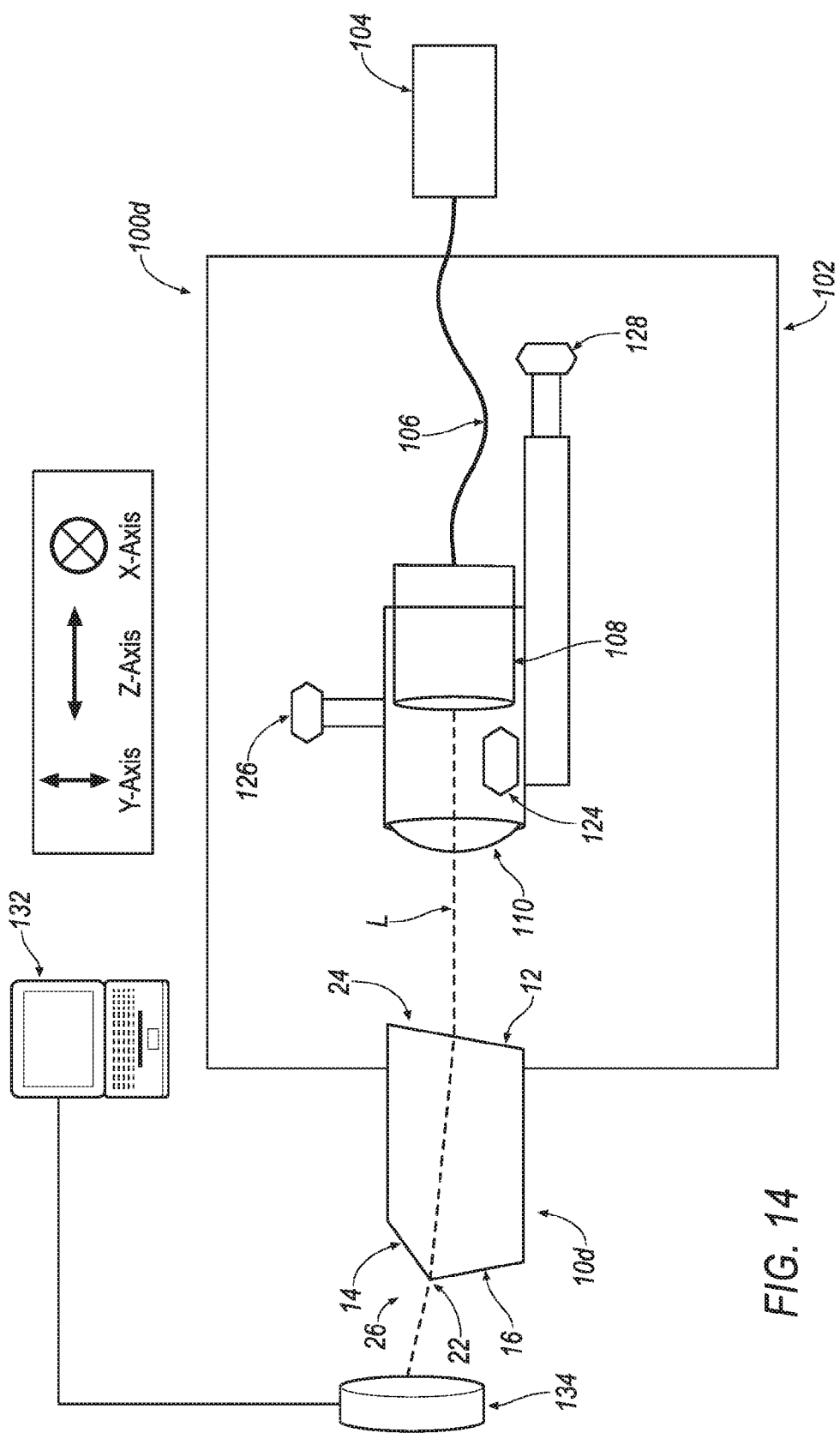
FIG. 14 is another schematic view of an exemplary system including a laser-transmitting machining tool.

With reference to FIG. 14, the system 100d may also include an energy meter or power meter 134. In an example, the power meter 134 may be connected to the computer workstation 132. As seen in FIG. 14, the IR beam of the light beam L (that is also to be used during the laser-assisted cutting process for cutting the workpiece W) may be utilized for conducting a fine alignment and precise positioning of the light beam L with respect to the geometry of the laser-transmitting cutting tool 10d. Accordingly, in an example, the IR beam (or alternate wavelength) passes through the cutting edge 22 or nose radius of the laser-transmitting cutting tool 10d and the output power of the IR beam is measured by the power meter 134 in order to center the light beam L.

Figure 15:
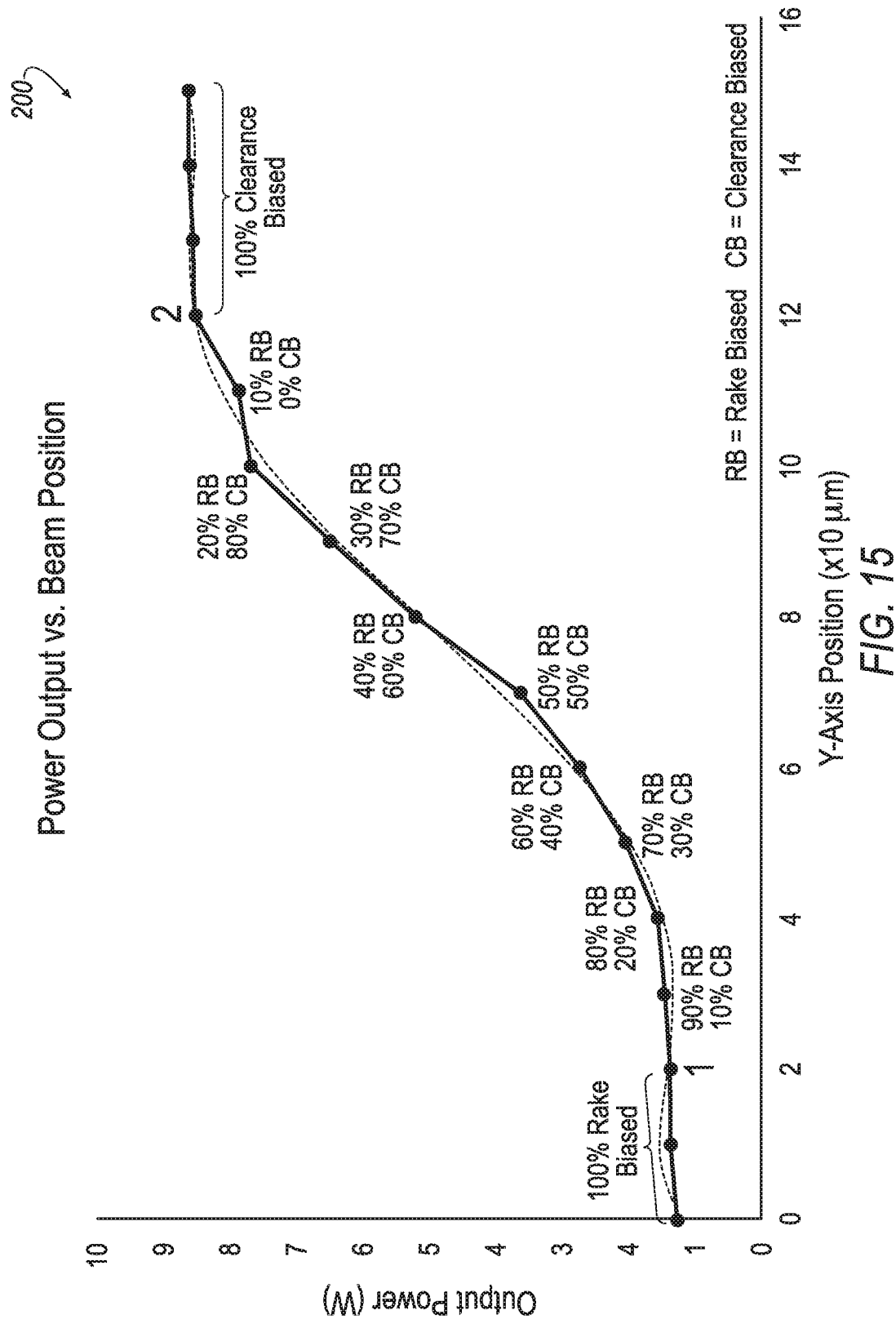
FIG. 15 is a graph illustrating exemplary test data obtained from a single crystal, diamond-based laser-transmitting machining tool.

Referring to FIG. 15, a graph 200 illustrating exemplary test data obtained from a single crystal, diamond-based laser-transmitting machining tool 10 is shown. The single crystal, diamond-based laser-transmitting machining tool 10 may be defined by a 0.5 mm nose radius. The data associated with the graph 200 was gathered by adjusting or rotating the Y-axis micrometer adjustment knob 126 for moving the Y-axis position of the light beam L that effectively moves the light beam L along the rake and flank angles $\theta_{14}$, $\theta_{16}$. Once the data was plotted, points 1 and 2 were identified as the maximum limits associated with 100% rake bias of the light beam L and 100% flank bias of the light beam L. Points 1 and 2 were identified once the power readings sensed by the power meter 134 began to saturate at the rake and flank angles $\theta_{14}$, $\theta_{16}$. Once the effective zone (between points 1 and 2) were identified, the user may choose a desired light beam position and associated bias based on the workpiece W that is to be machined along with the geometry of the application and the laser-transmitting machining tool 10.

As explained above at FIGS. 5A-5E, a particular geometry of a laser-transmitting machining tool 10 may be chosen based on the geometries of a workpiece W and qualities of the material defining the workpiece W (i.e., the rake angle $\theta_{14}$ defining a midrange negative rake, a highly negative rake and a zero rake exhibit different levels of compressive and tensile forces on specific materials). In an example, some materials, such as ceramics and optical crystals are strong in compression and weak in tension, which would lead to a selected rake angle $\theta_{14}$ defining a highly negative rake (see, e.g., FIG. 5A).

In an example of using a highly negative rake angled laser-transmitting cutting tool 10d for machining silicon, a user of the system 100d may elect to bias the light beam L towards the rake face 14 of the highly negative rake angled laser-transmitting cutting tool 10d to support material removal occurring in the compressive region $W_C$ of the workpiece W. As explained above, the laser beam L weakens the molecular bonds in the compressive region $W_C$ of the workpiece W, therefore reducing the material's hardness, thereby making the material more machinable.

Alternatively, in another example, the user may decide that the machining process and tool forces are causing surface and subsurface damage of in the tensile region $W_T$ of the workpiece W. To minimize this, the user of the system 100d may choose to bias the light beam L towards the flank face 16 of the laser-transmitting cutting tool 10d where annealing or "healing" effect will minimize the occurrence of surface and subsurface damage in the tensile region $W_T$ of the workpiece W.

In yet another example in the case of machining a metals such as aluminum, a zero or positive rake angled laser-transmitting cutting tool 10d may be chosen by a user because metals are typically strong in the tensile region $W_T$ and weak in the compression region $W_C$. To further promote the machinability in the tensile region $W_T$ of the workpiece W, the light beam L may be biased towards the flank face 16 of the laser-transmitting cutting tool 10d.

Figure 16:
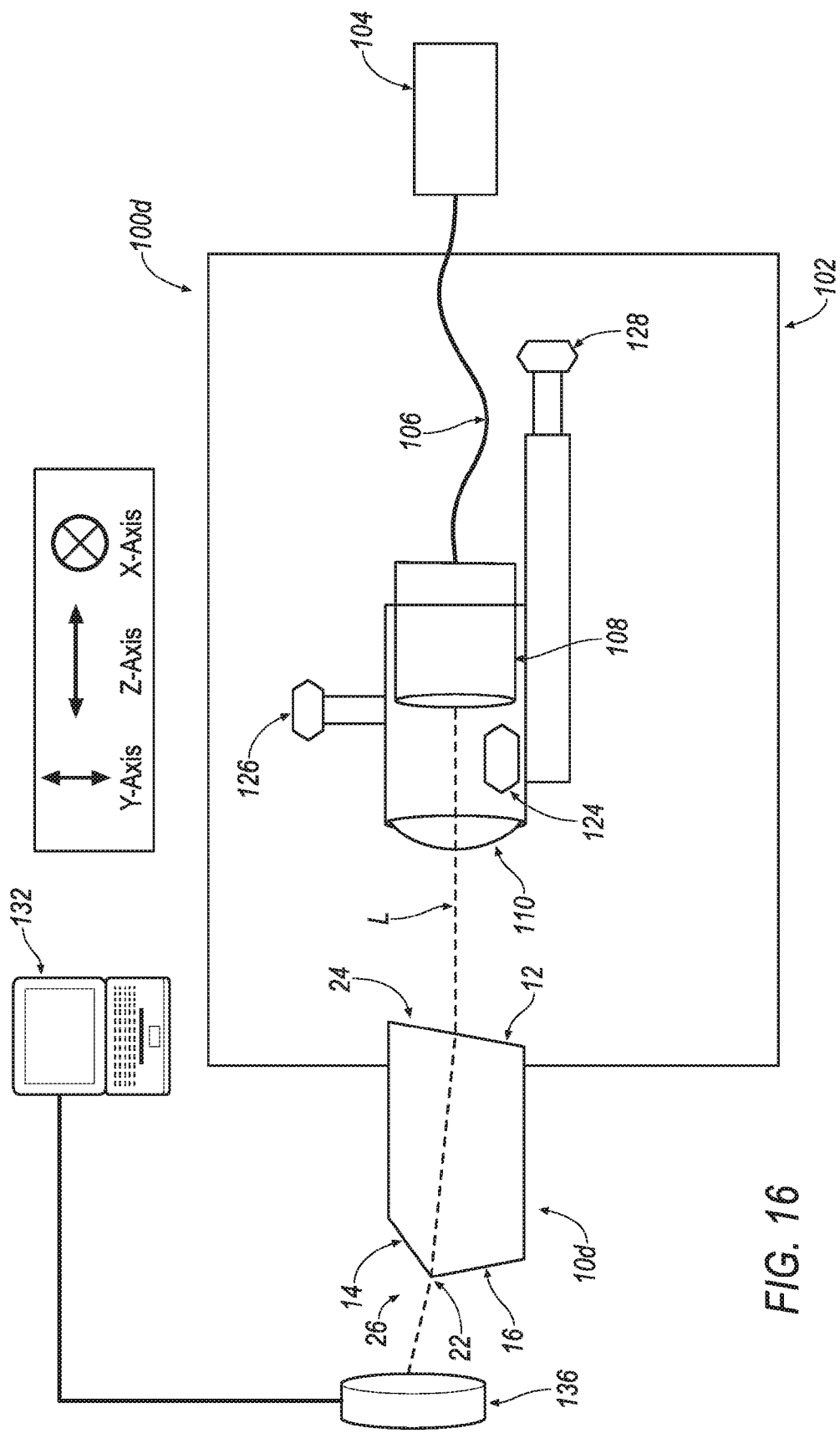
FIG. 16 is another schematic view of an exemplary system including a laser-transmitting machining tool.

Referring to FIG. 16, the system 100d may also include a beam profiler 136. In an example, the beam profiler 136 may be connected to the computer workstation 132. The light beam L may also be aligned using the beam profiler 136, which is sensitive enough to detect various angles and geometries of the laser-transmitting cutting tool 10d.

Figure 17:
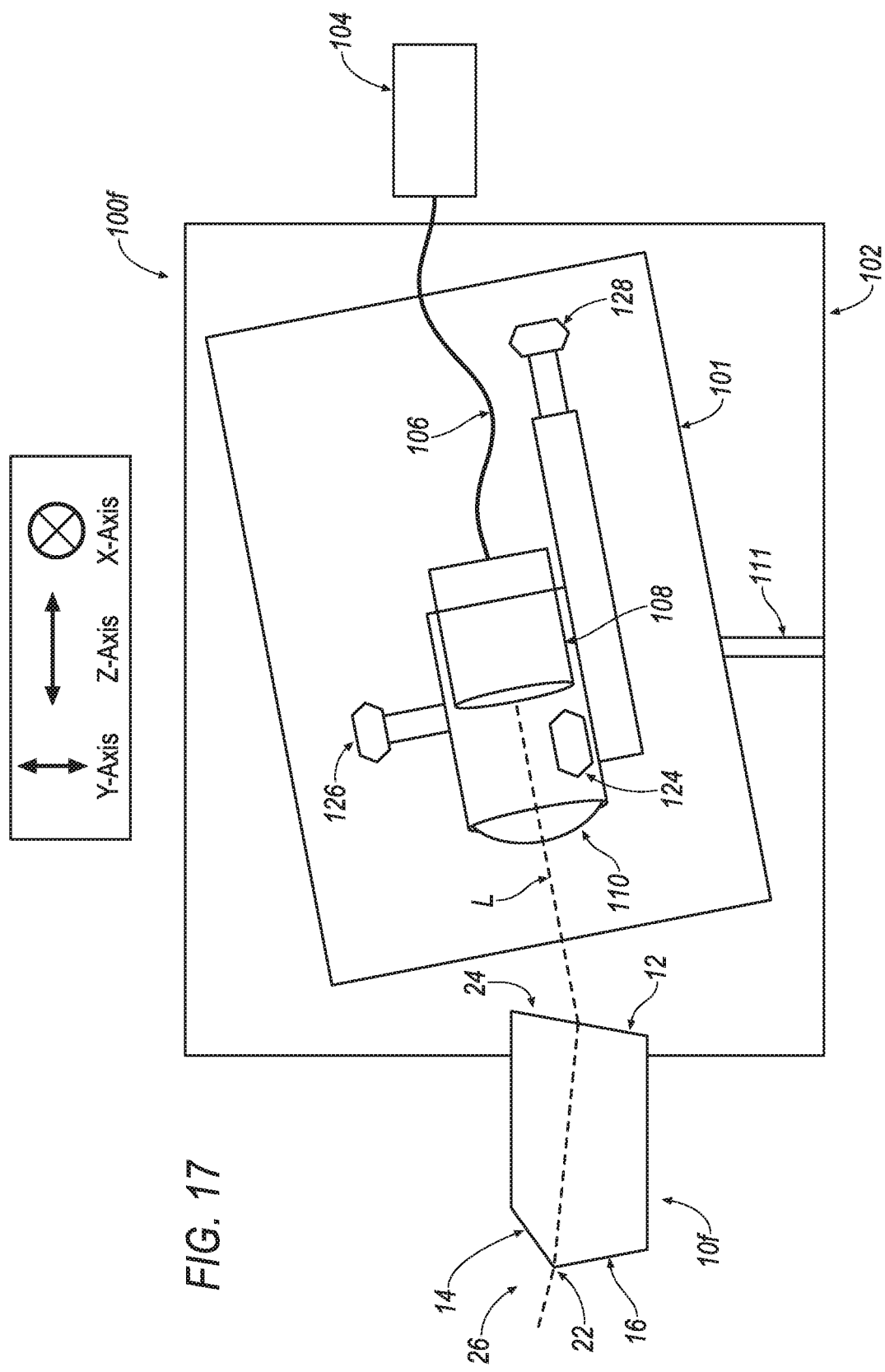
FIG. 17 is a schematic view of an exemplary system including a laser-transmitting machining tool.

With reference to FIG. 17, an exemplary system is shown generally at 100f. The system 100f is an exemplary cutting system including an exemplary laser-transmitting cutting tool 10f. The laser-transmitting cutting tool 10f may include a substantially similar geometry to that of the laser-transmitting machining tool 10 of FIG. 1 described above. The system 100f may include substantially similar structure and components of the system 100 of FIG. 7 and therefore are not described in further detail here. The system 100f may also include an optic sub-housing 101 contained within the housing 102. The optic sub-housing 101 may be connected to the housing 102 with a spatial adjusting device 111 for adjusting the optics 108, 110 contained within the optical sub-housing 101. Spatial adjustment of the optics 108, 110 in any of an X-direction, a Y-direction or a Z-direction of a three dimensional XYZ coordinate system adjusts entry of the laser beam L into the entrance face 12 of the laser-transmitting cutting tool 10f directing, shaping and positioning the laser beam L at the cutting edge 22 and one or both of the rake face 14 and flank face 16.

Figure 18:
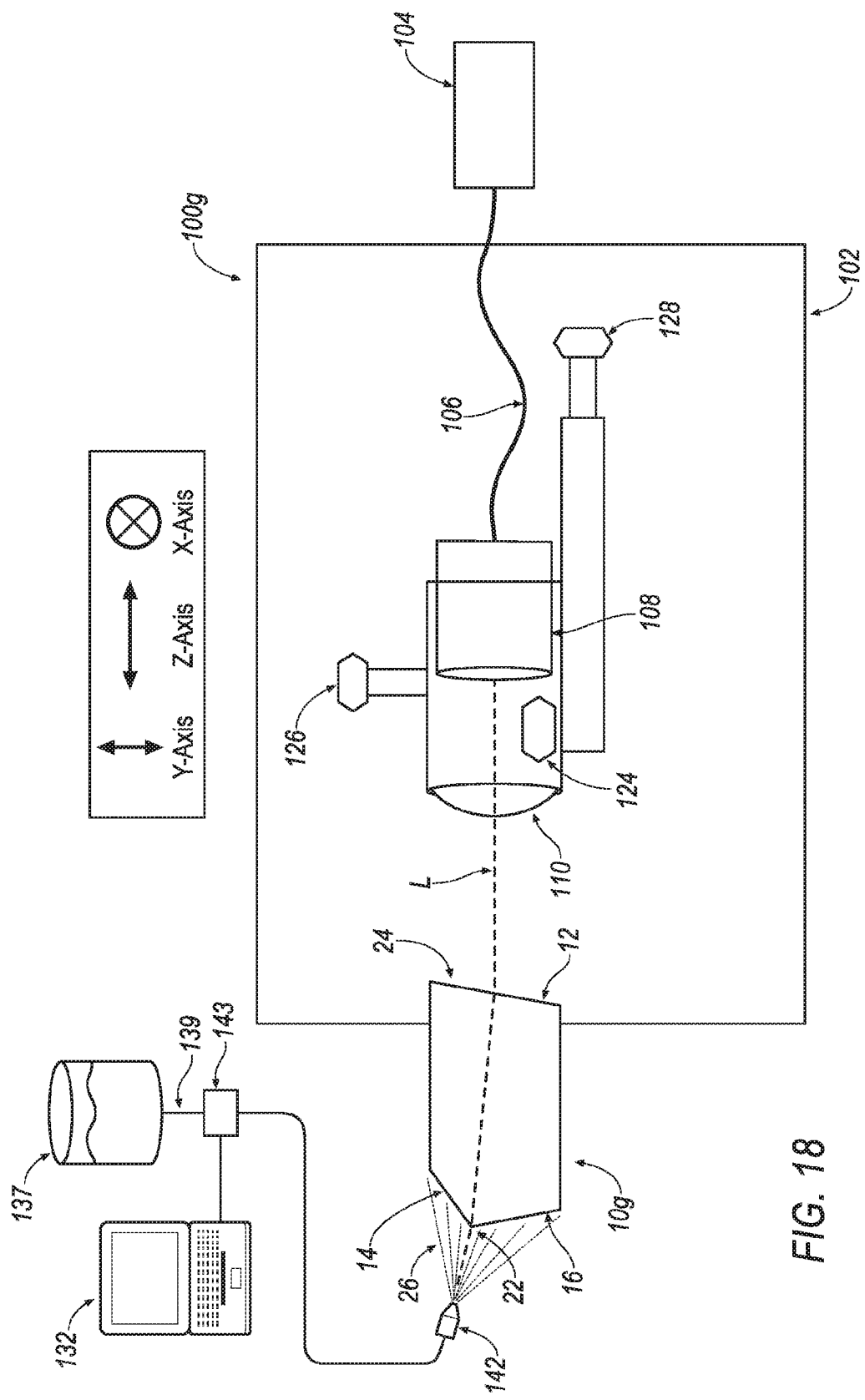
FIG. 18 is a schematic view of an exemplary system including a laser-transmitting machining tool.

With reference to FIG. 18, an exemplary system is shown generally at 100g. The system 100g is an exemplary cutting system including an exemplary laser-transmitting cutting tool 10g. The laser-transmitting cutting tool 10g may include a substantially similar geometry to that of the laser-transmitting machining tool 10 of FIG. 1 described above. The system 100g may include substantially similar structure and components of the system 100 of FIG. 7 and therefore are not described in further detail here. The system 100g may also include a heat-activated/laser-activated cutting fluid/slurry/etchant 137 that is contained within a supply or reservoir. The heat-activated/laser-activated cutting fluid/slurry/etchant 137 may be communicated out of the reservoir, through a hose 139 and out of a nozzle 141. An actuator 143 including one or more of a pump and valve may be fluidly connected to the hose 139 for asserting control over an amount of heat-activated/laser-activated cutting fluid/slurry/etchant 137 that is to be sprayed or disposed upon the laser beam exit end 26 of the laser-transmitting cutting tool 10g. In an example, a computer workstation 132 may be connected to the actuator 143 for, as an example, sending a signal to the actuator 143 for permitting a constant flow or periodic flow (e.g., by successively opening and closing the valve) of heat-activated/laser-activated cutting fluid/slurry/etchant 137 toward the laser beam exit end 26 of the laser-transmitting cutting tool 10g. Although the heat-activated/laser-activated cutting fluid/slurry/etchant 137 may be pumped, the heat-activated/laser-activated cutting fluid/slurry/etchant 137 may alternatively be gravity fed. Furthermore, although the heat-activated/laser-activated cutting fluid/slurry/etchant 137 may be sprayed, the heat-activated/laser-activated cutting fluid/slurry/etchant 137 may be alternatively misted or flooded. The heat-activated/laser-activated cutting fluid/slurry/etchant 137 may be disposed upon the laser beam exit end 26 of the laser-transmitting cutting tool 10g in a turning, drilling, grinding or polishing application. Furthermore, the heat-activated/laser-activated cutting fluid/slurry/etchant 137 may be directed toward the workpiece W, the laser-transmitting cutting tool 10g or both of the workpiece W and the laser-transmitting cutting tool 10g.

Figure 19:
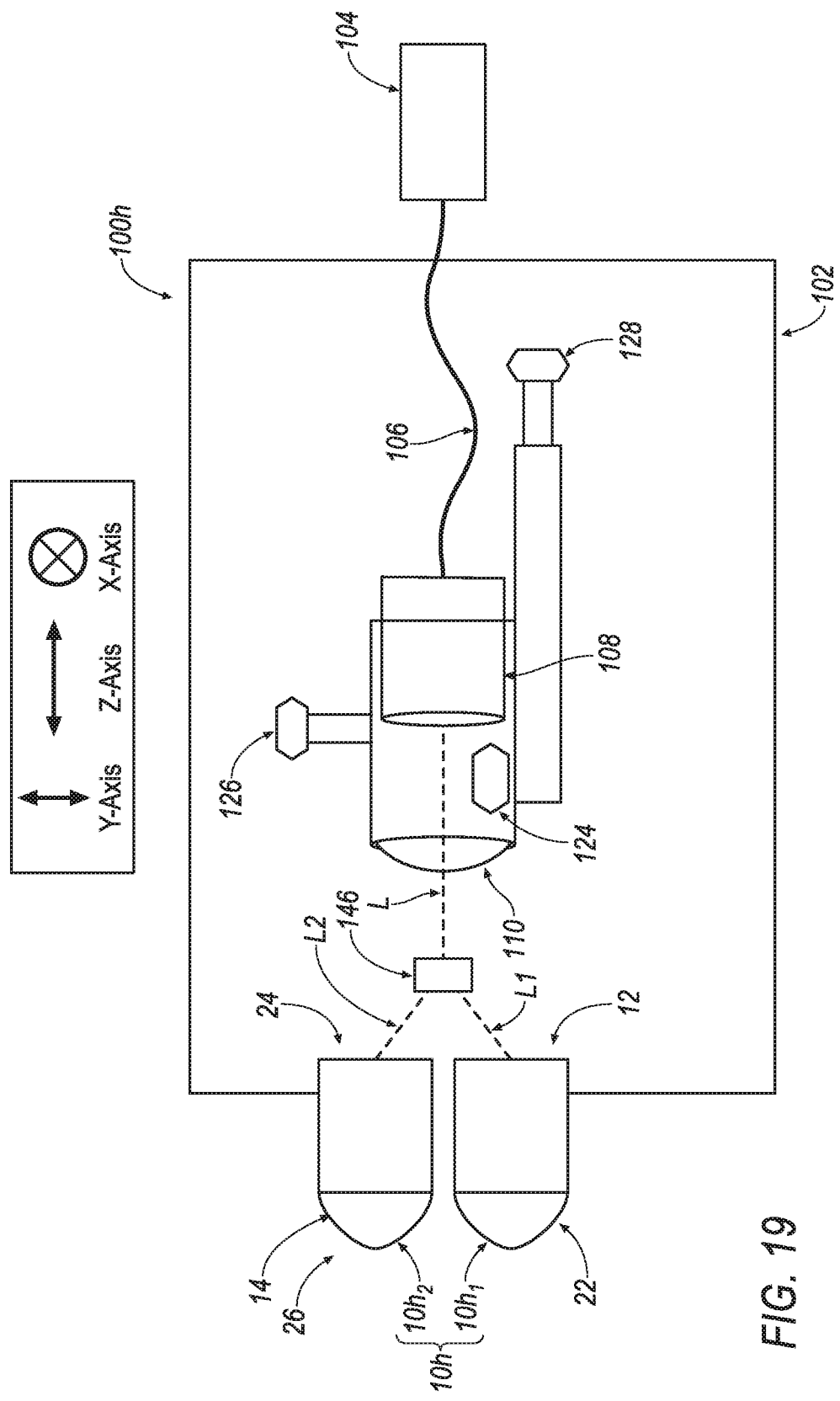
FIG. 19 is a schematic view of an exemplary system including a laser-transmitting machining tool.

With reference to FIG. 19, an exemplary system is shown generally at 100h. The system 100h is an exemplary cutting system including a least one (e.g., two at $10h_1$ and $10h_2$) exemplary laser-transmitting cutting tool 10h. Each laser-transmitting cutting tool $10h_1$, $10h_2$ may include a substantially similar geometry to that of the laser-transmitting machining tool 10 of FIG. 1 described above. The system 100h may include substantially similar structure and components of the system 100 of FIG. 7 and therefore are not described in further detail here. The system 100h may also include a beam splitter 146. The beam splitter 146 splits the laser beam L into a first beam portion L1 and a second beam portion L2. The first beam portion L1 is directed to the entrance face 12 of the first laser-transmitting cutting tool $10h_1$ and the second beam portion L2 is directed to the entrance face 12 of the second laser-transmitting cutting tool $10h_2$. The system 100h may be utilized for simultaneously directing laser energy to the first laser-transmitting cutting tool $10h_1$ and the second beam portion L2 is directed to the entrance face 12 of the second laser-transmitting cutting tool $10h_2$.

Figure 20:
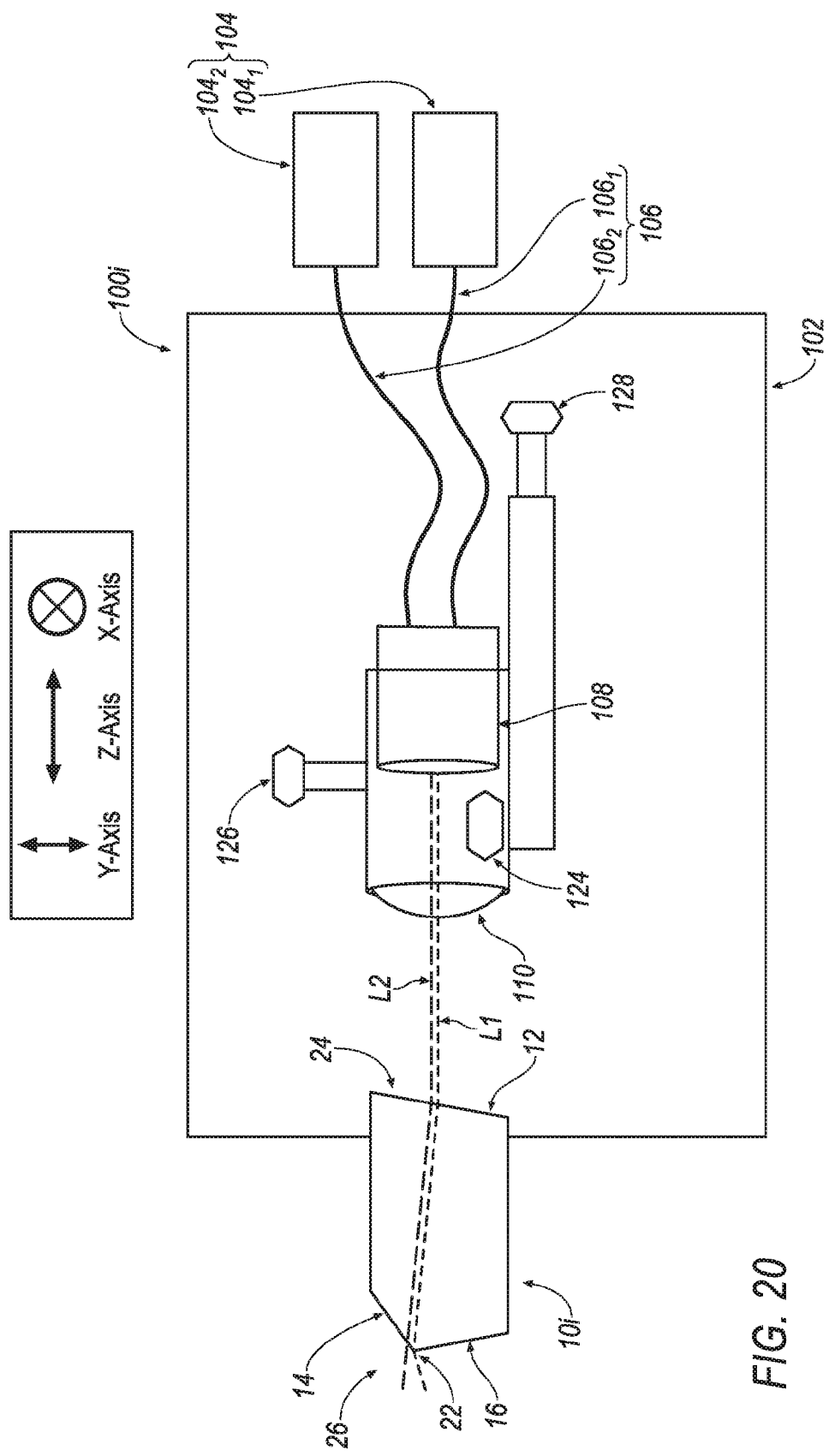
FIG. 20 is a schematic view of an exemplary system including a laser-transmitting machining tool.

With reference to FIG. 20, an exemplary system is shown generally at 100i. The system 100i is an exemplary cutting system including exemplary laser-transmitting cutting tool 10i and at least one (e.g., two at $104_1$ and $104_2$) laser generators 104h. The laser-transmitting cutting tool 10i may include a substantially similar geometry to that of the laser-transmitting machining tool 10 of FIG. 1 described above. The system 100i may include substantially similar structure and components of the system 100 of FIG. 7 and therefore are not described in further detail here. The first laser generator $104_1$ generates a first laser beam L1 that is conveyed through a first optical fiber $106_1$ that is subsequently directed to the entrance face 12 of the laser-transmitting cutting tool 10i and the second laser generator $104_2$ generates a second laser beam L2 that is conveyed through a second optical fiber $106_2$ that is subsequently directed to the entrance face 12 of the laser-transmitting cutting tool 10*i*. The first laser beam L1 and the second laser beam L2 may be defined by unique wavelengths that are delivered to different portions (e.g., the cutting edge 22, the rake face 14 and the flank face 16) of the laser beam exit end 26 of the laser-transmitting cutting tool 10*g* in order to provide multiple sources of laser energy to different sides of the laser-transmitting cutting tool 10*g* for providing different types of laser energy to the workpiece W.

Figure 21:
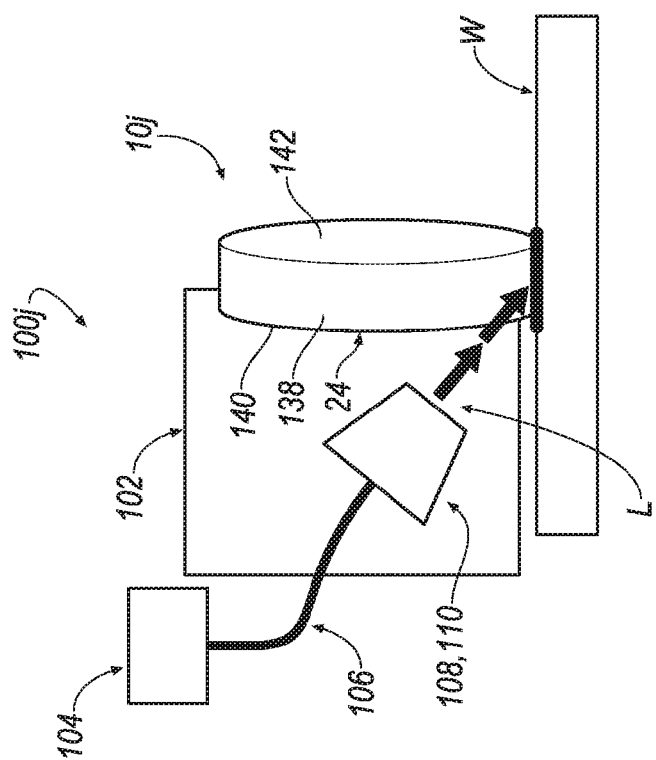
FIG. 21 is a schematic view of an exemplary system including a laser-transmitting grinding tool.

Referring to FIG. 21, an exemplary system is shown generally at 100*j*. The system 100*j* is a grinding system including a laser-transmitting grinding tool 10*j* that grinds a workpiece W. In some instances, the grinding tool 10*j* may be utilized in a polishing operation and therefore the tool 10*j* and system 100*j* may be alternatively referred to as a laser-transmitting polishing tool and a polishing system. The laser-transmitting grinding tool 10*j* may be shaped to define disk having a wheel or tire shape defined by a tread surface 138 that joins first and second sidewall surfaces 140, 142. The system 100*j* may include substantially similar structure and components (e.g., the housing 102 and the like) of the system 100 of FIG. 7 and therefore are not described in further detail here. As seen in FIG. 21, the laser beam L is directed to the laser beam entrance end 24 defining the first sidewall surface 140 of the laser-transmitting grinding tool 10*j* and then exits the laser beam exit end 26 defining the tread surface 138 of the laser-transmitting grinding tool 10*j*. The tread surface 138 directly engages the workpiece W, which is heated and softened by the laser beam L for increasing the machinability (i.e., grinding) of the workpiece W.

Figure 22:
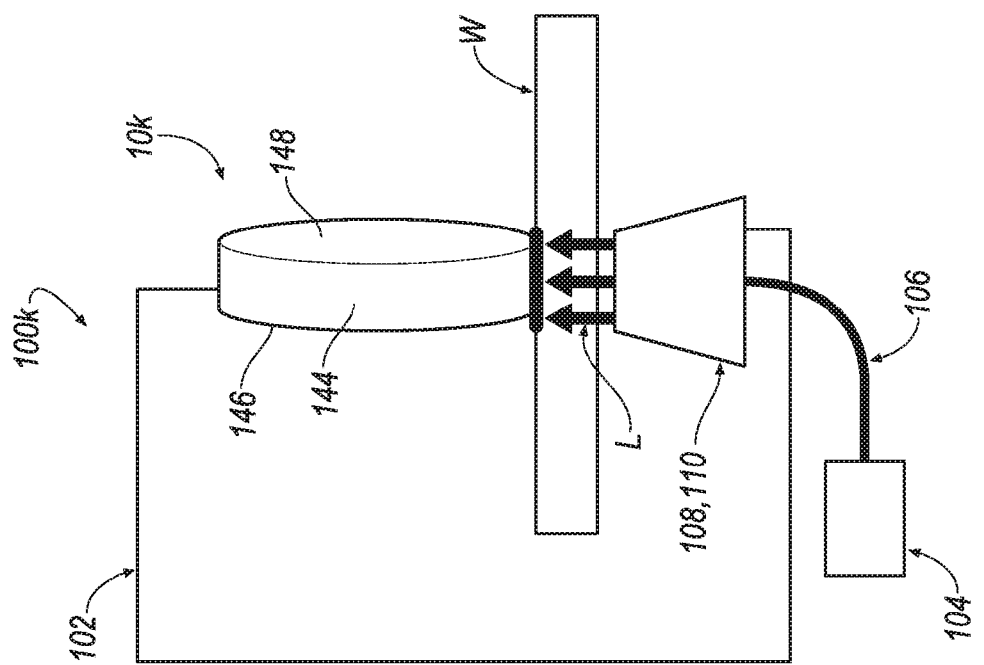
FIG. 22 is a schematic view of an exemplary system including a transparent workpiece and a non-laser-transmitting grinding tool.

Referring to FIG. 22, an exemplary system is shown generally at 100*k*. The system 100*k* is a grinding system including a laser-transmitting workpiece W and a non-optically-transmitting grinding tool 10*k* that grinds the workpiece W. The non-optically-transmitting grinding tool 10*k* may be shaped to define disk having a wheel or tire shape defined by a tread surface 144 that joins first and second sidewall surfaces 146, 148. The system 100*k* may include substantially similar structure and components (e.g., the housing 102 and the like) of the system 100 of FIG. 7 and therefore are not described in further detail here. As seen in FIG. 22, the laser beam L is directed through the workpiece W at the tread surface 144 of the of the non-optically-transmitting grinding tool 10*k*. As a result of the laser beam L being incident upon the tread surface 144 of the non-optically-transmitting grinding tool 10*k*, the tread surface 144 is heated by the laser beam L for increasing the machinability (i.e., grinding) of the workpiece W.

Referring to FIG. 23, an exemplary system is shown generally at 100*l*. The system 100*l* is a material characterization testing system including a laser-transmitting indentation tool 10*l* that indents a workpiece W. The system 100*e* may include substantially similar structure and components (e.g., the housing 102 and the like) of the system 100 of FIG. 7 and therefore are not described in further detail here.

In an example, the laser-transmitting indentation tool 10*l* of the system 100*l* indents (on a nano, micro or macro level) to test material hardness of the workpiece W. The material hardness test may be conducted at or about room temperature (e.g., 72° F.) in order to determine material behavior, stability and hardness at elevated temperatures.

A tool shaft 150 may extend from the downstream end $102_D$ of the housing 102. A load-applying actuator 152 may be joined to the tool shaft 150 and a displacement sensor 154 may be arranged about the tool shaft 150. After the workpiece W is heated and softened by the laser-transmitting indentation tool 10*l*, the load-applying actuator 152 is actuated for plunging the tool shaft 150 toward the workpiece W. The displacement sensor 154 detects an amount of travel of the tool shaft 150 in the plunging direction toward the workpiece W as a result of the laser-transmitting indentation tool 10*l* being driven into and indenting the workpiece W. The displacement sensor 154 is connected to the computer workstation 132 for displaying on a display the amount of travel of the tool shaft 150 and a corresponding hardness of the material of the workpiece W associated with the amount of travel of the tool shaft 150.

Figure 24:
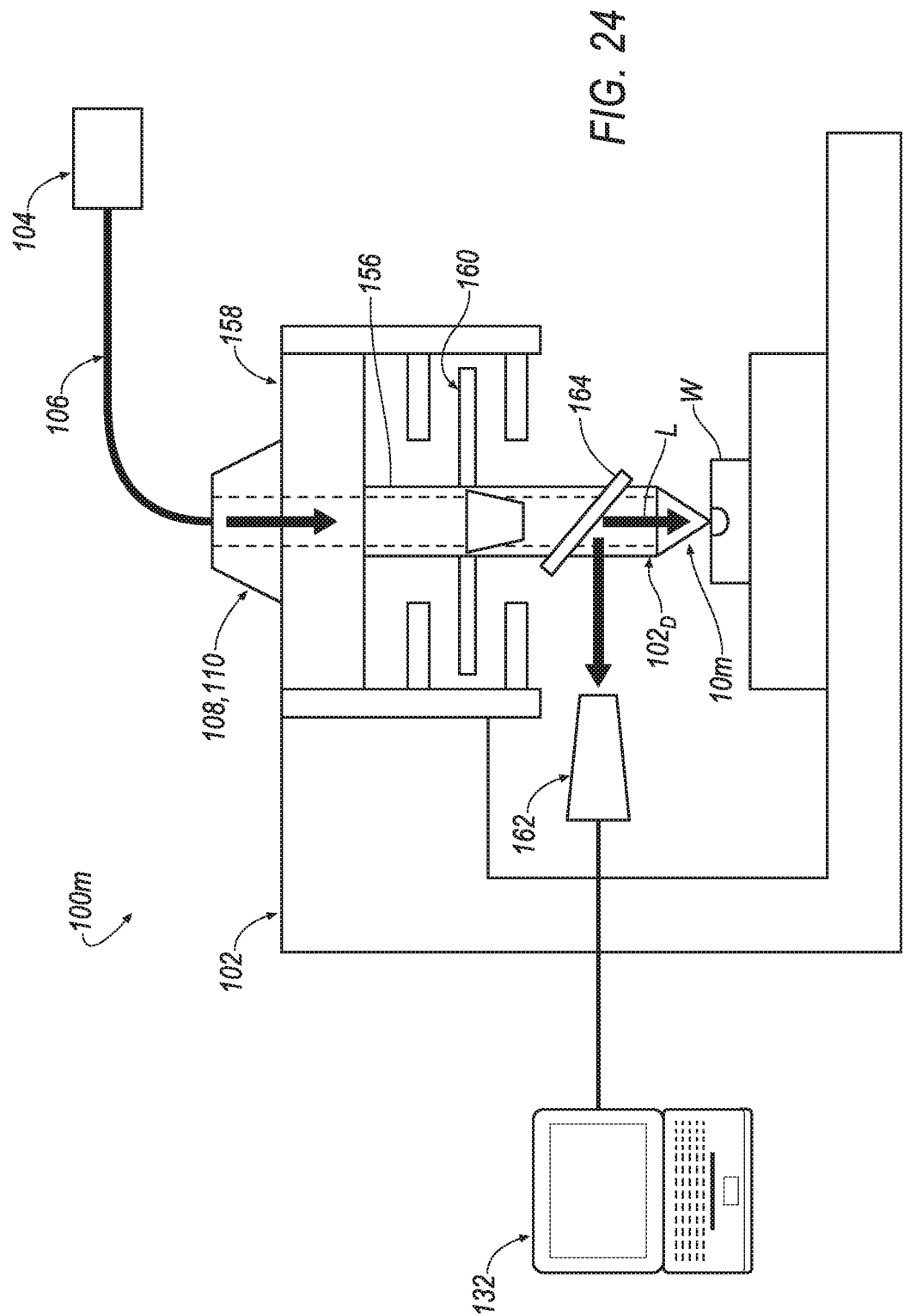
FIG. 24 is a schematic view of an exemplary material characterization testing system including a laser-transmitting indentation tool that indents a workpiece W.

Referring to FIG. 24, an exemplary system is shown generally at 100*m*. The system 100*m* is a material characterization testing system including a laser-transmitting indentation tool 10*m* that indents a workpiece W. The system 100*m* may include substantially similar structure and components (e.g., the housing 102 and the like) of the system 100 of FIG. 7 and therefore are not described in further detail here.

In an example, the laser-transmitting indentation tool 10*m* of the system 100*m* indents (on a nano, micro or macro level) to test material hardness of the workpiece W. The material hardness test may be conducted at or about room temperature (e.g., 72° F.) in order to determine material behavior, stability and hardness at elevated temperatures.

Like the system 100*l* of FIG. 23, the system 100*m* includes a tool shaft 156 extending from the downstream end $102_D$ of the housing 102. A load-applying actuator 158 may be joined to the tool shaft 156 and a displacement sensor 160 may be arranged about the tool shaft 156. The load-applying actuator 158 is actuated for plunging the tool shaft 156 toward the workpiece W. The displacement sensor 160 detects an amount of travel of the tool shaft 156 in the plunging direction toward the workpiece W as a result of the laser-transmitting indentation tool 10*m* being driven into and indenting the workpiece W. The displacement sensor 160 is connected to the computer workstation 132 for displaying on a display the amount of travel of the tool shaft 156 and a corresponding hardness of the material of the workpiece W associated with the amount of travel of the tool shaft 156.

The system 100*m* may also include, for example, a charge coupled device (CCD) or complementary metal oxide semiconductor (CMOS) camera 162 and a beam splitter or laser-beam-reflecting-mirror 164 arranged within the housing 102. The CCD camera 162 is connected to the computer workstation 132 for conducting Raman spectroscopy such that the laser beam L is also reflected by the a laser-beam-reflecting-mirror 164 back toward the CCD camera 162 for capturing images of scattered rays $\Phi_A$, $\Phi_{R1}$, $\Phi_{R2}$ of the laser beam L in order to perform in-situ characterization material of the workpiece W during the indentation process.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A laser-transmitting machining tool for machining a workpiece, the laser-transmitting machining tool comprising:

a body of material having an entrance face, a rake face, a flank face connected to the rake face, a rake side face extending between the entrance face and the rake face, and a flank side face extending between the entrance face and the flank face,
wherein the connection of the rake face to the flank face defines a cutting edge,
wherein the entrance face is configured to receive and refract a laser beam to the rake face, the flank face, and the cutting edge, causing the laser beam to refract into and heat the workpiece at a compression region extending proximate at least the rake face and a tensile region extending proximate the flank face, and
wherein the rake face extends away from the rake side face to define a rake angle and the flank face extends away from the flank side face to define a flank angle relative to the rake angle, the rake angle is sized to define one of the following rake angles including:
  a highly negative rake angle causing the compression region of the workpiece to be a highest compression region and the tensile region of the workpiece to be a lowest tensile region;
  a midrange negative rake angle causing the compression region of the workpiece to be a high compression region and the tensile region of the workpiece to be a low tensile region;
  a low-range negative rake angle causing the compression region of the workpiece to be a medium compression region and the tensile region of the workpiece to be a medium tensile region;
  a zero rake angle causing the compression region of the workpiece to be a low compression region and the tensile region of the workpiece to be a high tensile region; and
  a positive rake angle causing the compression region of the workpiece to be a lowest compression region and the tensile region of the workpiece to be a highest tensile region.

2. The laser-transmitting machining tool of claim 1, wherein each of the highest compression region, the high compression region, the medium compression region, the low compression region and the lowest compression region also extends along the cutting edge.

3. The laser-transmitting machining tool of claim 1, wherein each of the highest tensile region, the high tensile region, the medium tensile region, the low tensile region and the lowest tensile region also extends along the cutting edge.

4. The laser-transmitting machining tool of claim 1, wherein the highly negative rake angle is less than each of the midrange negative rake angle, the low-range negative rake angle, the zero rake angle and the positive rake angle.

5. The laser-transmitting machining tool of claim 1, wherein the highly negative rake angle is greater than about 90° and less than about 135°, wherein the midrange rake angle is greater than about 136° and less than about 165°, wherein the low-range negative rake angle is greater than about 166° and less than about 179°.

6. The laser-transmitting machining tool of claim 1, wherein the zero rake angle is approximately 180°.

7. The laser-transmitting machining tool of claim 1, wherein the positive rake angle is greater than about 181° and less than about 210°.

8. The laser-transmitting machining tool of claim 1, wherein the material is selected from the group consisting of: a diamond, a sapphire, a carbide, cubic boron nitride (CBN), silicon, nitrides, steels, alloys, ceramics, alumina, crystals and glass composites.

9. The laser-transmitting machining tool of claim 1, wherein the material comprises diamond, wherein the rake angle is sized to define the highly negative rake angle, the midrange negative rake angle or low-range negative rake angle, wherein a relief angle defined by the entrance face relative to the laser beam is approximately 5°.

10. The laser-transmitting machining tool of claim 1, wherein the material comprises sapphire, wherein the rake angle is sized to define the highly negative rake angle, the midrange negative rake angle or low-range negative rake angle, wherein a relief angle defined by the entrance face relative to the laser beam is approximately 7°.

11. The laser-transmitting machining tool of claim 1, wherein the material comprises diamond, wherein the rake angle is sized to define zero rake angle, wherein a relief angle defined by the entrance face relative to the laser beam is approximately 7°.

12. The laser-transmitting machining tool of claim 1, further comprising an anti-reflective coating disposed over the entrance face.

13. A system for machining a workpiece comprising:
  a laser-transmitting machining tool including a body of material having a plurality of faces including a rake face that is connected to a flank face for defining a cutting edge of the laser-transmitting machining tool, wherein the rake face extends away from a side face of the plurality of faces to define a rake angle, wherein the rake angle is sized to define one of a plurality of rake angles including:
    a highly negative rake angle causing the compression region of the workpiece to be a highest compression region and the tensile region of the workpiece to be a lowest tensile region;
    a midrange negative rake angle causing the compression region of the workpiece to be a high compression region and the tensile region of the workpiece to be a low tensile region;
    a low-range negative rake angle causing the compression region of the workpiece to be a medium compression region and the tensile region of the workpiece to be a medium tensile region;
    a zero rake angle causing the compression region of the workpiece to be a low compression region and the tensile region of the workpiece to be a high tensile region; and
    a positive rake angle causing the compression region of the workpiece to be a lowest compression region and the tensile region of the workpiece to be a highest tensile region,
  wherein the plurality of faces define a laser beam entrance end of the laser-transmitting machining tool and a laser beam exit end of the laser-transmitting machining tool, wherein the laser beam exit end is defined by the rake face, the flank face and the cutting edge;
  a housing having an upstream end and a downstream end, wherein the downstream end of the housing is optically-connected to the laser beam exit end of the laser-transmitting machining tool;
  a laser generator optically-connected to the upstream end of the housing for optically-communicating a laser beam generated by the laser generator from the upstream end of the housing to the laser beam entrance end, through the body of material, and out of:
    the cutting edge; and
    one or both of the rake face and the flank face.

14. The system of claim 13, wherein the housing includes:
  optics; and
  an optics interface, wherein the optics includes at least a collimating lens and a series of focusing lens, wherein the collimating lens is optically-connected to the laser generator for collimating the laser beam prior to being received by the laser beam entrance end of the laser-transmitting machining tool, wherein the series of focusing lens are optically-connected to the collimating lens for focusing the laser beam prior to being received by the laser beam entrance end of the laser-transmitting machining tool, wherein the optics interface includes a focusing knob connected to the series of focusing lens that adjusts focal plane and a diameter of the laser beam for selectively biasing rays of the laser beam toward the rake face or the flank face, wherein the optics interface includes one or more beam positioning stages connected to the series of focusing lens that alters an angle of laser beam as the laser beam exits the collimating lens.

15. The system of claim 14 further including:
an X-axis micrometer adjustment knob connected to the optics;
a Y-axis micrometer adjustment knob connected to the optics; and
a Z-axis micrometer adjustment knob optics, wherein the X-, Y- and Z-axis micrometer adjustment knobs are connected to the optics for selectively biasing rays of the laser beam toward the rake face or the flank face.

16. The system of claim 14 further including:
an optic sub-housing contained within the housing, wherein the optic sub-housing is connected to the housing with a spatial adjusting device for adjusting the optics contained within the optical sub-housing in any of an X-direction, a Y-direction or a Z-direction of a three dimensional XYZ coordinate system for adjusting entry of the laser beam into the laser beam entrance end of the laser-transmitting machining tool.

17. The system of claim 13 further including:
a heat-activated or laser-activated cutting fluid, slurry or etchant contained within a supply or reservoir that is communicated out of a nozzle to the laser beam exit end of the laser-transmitting cutting tool; and
an actuator including one or more of a pump and valve that is fluidly connected to the supply or reservoir for asserting control over an amount of the heat-activated or laser-activated cutting fluid, slurry or etchant that is to be disposed upon the laser beam exit end of the laser-transmitting cutting tool.

18. The system of claim 13 further including:
a second laser generator optically-connected to the upstream end of the housing for optically-communicating a second laser beam generated by the second laser generator from the upstream end of the housing to the laser beam entrance end, through the body of material, and out of:
the cutting edge; and
one or both of the rake face and the flank face.

19. The system of claim 15 further including:
a visible beam imaging camera includes beam alignment software; and
a computer workstation connected to the visible beam imaging camera, wherein the visible beam imaging camera images a visible calibration light beam propagating through laser-transmitting machining tool and communicates an image of the visible calibration light beam propagating through the laser-transmitting machining tool to the beam alignment software, wherein, upon the beam alignment software determining that the visible calibration light beam passing through the laser-transmitting machining tool is not aligned, the beam alignment software provides instructions to the computer workstation for displaying on a display instructions or a suggested optimization value associated with adjustment or rotation of one or more of the X-, Y- and Z-axis micrometer adjustment knobs.

20. The system of claim 19 further including:
an energy meter or power meter connected to the computer workstation for measuring output power of the laser beam passing through the cutting edge of the laser-transmitting machining tool.

21. The system of claim 19 further including:
a beam profiler connected to the computer workstation for detecting an orientation angle or geometry of the laser-transmitting machining tool for aligning the laser beam passing through the laser-transmitting machining tool.

22. The system of claim 13 further including:
a precision tool height adjuster connected to the housing.

23. The system of claim 13 further including:
a smart swivel system connected to the housing.

24. The system of claim 13 further including:
an isolated rotary bearing system connected to the housing; and
a beam splitter disposed within and arranged near the downstream end of the housing for delivering the laser beam to multiple locations of the laser beam entrance face.

25. A method for machining a workpiece, the method comprising:
transmitting, from a laser generator, a laser beam;
receiving, at an upstream end of a housing that is optically-connected to the laser generator, the laser beam;
receiving, at a laser beam entrance face that defines a laser beam entrance end of a laser-transmitting machining tool that is optically-connected to a downstream end of a housing, the laser beam;
transmitting the laser beam through the a body of material of the laser-transmitting machining tool that extends between the laser beam entrance end of the laser-transmitting machining tool and a laser beam exit end of the laser-transmitting machining tool;
selectively directing the laser beam out of a cutting edge of the laser-transmitting machining tool and one or both of a rake face of the laser-transmitting machining tool and a flank face of the laser-transmitting machining tool, wherein the cutting edge, the rake face and the flank face defines the laser beam exit end of the laser-transmitting machining tool, wherein the rake face extends away from a side face of the laser-transmitting machining tool to define a rake angle, wherein the rake angle is sized to define one of a plurality of rake angles including:
a highly negative rake angle causing the compression region of the workpiece to be a highest compression region and the tensile region of the workpiece to be a lowest tensile region;
a midrange negative rake angle causing the compression region of the workpiece to be a high compression region and the tensile region of the workpiece to be a low tensile region;
a low-range negative rake angle causing the compression region of the workpiece to be a medium compression region and the tensile region of the workpiece to be a medium tensile region;
a zero rake angle causing the compression region of the workpiece to be a low compression region and the tensile region of the workpiece to be a high tensile region; and a positive rake angle causing the compression region of the workpiece to be a lowest compression region and the tensile region of the workpiece to be a highest tensile region.

26. The method of claim 25, wherein the laser beam is defined by a diameter having a central ray extending along a central axis of the laser beam, a first circumferential array of rays arranged at a first radial distance away from the central axis of the laser beam and at least one second circumferential array of rays arranged at a second radial distance away from the central axis of the laser beam whereby the second radial distance is greater than the first radial distance, wherein selectively directing the laser beam includes:
  directing the central ray of the laser beam out of the cutting edge of the laser-transmitting machining tool; and
  biasing one or both of the first circumferential array of rays of the laser beam and the second circumferential array of rays of the laser beam toward one of the rake face and the flank face.

27. The method of claim 26, wherein biasing one or both of the first circumferential array of rays of the laser beam and the second circumferential array of rays of the laser beam toward one of the rake face and the flank face includes:
  adjusting a focusing knob connected to a series of focusing lens disposed within the housing that adjusts focal plane and the diameter of the laser beam.

28. The method of claim 26, wherein biasing one or both of the first circumferential array of rays of the laser beam and the second circumferential array of rays of the laser beam toward one of the rake face and the flank face includes:
  adjusting one or more beam positioning stages connected to a series of focusing lens disposed within the housing for altering an angle of laser beam as the laser beam exits a collimating lens disposed within the housing.

29. The method of claim 26, wherein biasing one or both of the first circumferential array of rays of the laser beam and the second circumferential array of rays of the laser beam toward one of the rake face and the flank face includes:
  adjusting one or more of an X-axis micrometer adjustment knob, a Y-axis micrometer adjustment knob connected to the optics and a Z-axis micrometer adjustment knob connected to a series of focusing lens disposed within the housing.

* * * * *